US011481885B2

(12) United States Patent
Dal Mutto et al.

(10) Patent No.: US 11,481,885 B2
(45) Date of Patent: Oct. 25, 2022

(54) SYSTEMS AND METHODS FOR OBJECT DIMENSIONING BASED ON PARTIAL VISUAL INFORMATION

(71) Applicant: PACKSIZE LLC, Salt Lake City, UT (US)

(72) Inventors: Carlo Dal Mutto, Sunnyvale, CA (US); Kinh Tieu, Sunnyvale, CA (US); Francesco Peruch, Sunnyvale, CA (US); Jason Trachewsky, Menlo Park, CA (US); Tony Zuccarino, Saratoga, CA (US); Chase Garber, Palo Alto, CA (US)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

(21) Appl. No.: 16/724,029

(22) Filed: Dec. 20, 2019

(65) Prior Publication Data

US 2020/0372626 A1 Nov. 26, 2020

Related U.S. Application Data

(60) Provisional application No. 62/783,141, filed on Dec. 20, 2018.

(51) Int. Cl.
*G06T 7/00* (2017.01)
*G06T 7/10* (2017.01)
(Continued)

(52) U.S. Cl.
CPC ........... *G06T 7/0002* (2013.01); *G06N 3/084* (2013.01); *G06T 3/4046* (2013.01); *G06T 7/10* (2017.01);
(Continued)

(58) Field of Classification Search
CPC ....... G06T 7/0002; G06T 7/10; G06T 3/4046; G06T 17/00; G06T 2207/10012;
(Continued)

(56) References Cited

U.S. PATENT DOCUMENTS 8,718,393 B2 * 5/2014 Chen .................. G06T 17/00
382/256
9,245,196 B2 * 1/2016 Marks .................. G06V 40/10
(Continued)

OTHER PUBLICATIONS

Nguyen et al., 2016, IEEE Publication, "A field Model for Repairing 3D Shapes" (pp. 5676-5684). (Year: 2016).*
(Continued)

*Primary Examiner* — Manav Seth
(74) *Attorney, Agent, or Firm* — Workman Nydegger

(57) ABSTRACT

A method for estimating tightly enclosing bounding boxes by a computing system includes: controlling a scanning system including one or more depth cameras to capture visual information of the scene including one or more objects; detecting the one or more objects of the scene based on the visual information; singulating each the one or more objects from the frame of the scene to generate one or more 3D models corresponding to the one or more objects, the one or more 3D models including a partial 3D model of a corresponding one of the one or more objects; extrapolating a more complete 3D model of the corresponding one of the one or more objects based on the partial 3D model; and estimating a tightly enclosing bounding box of the corresponding one of the one or more objects based on the more complete 3D model.

19 Claims, 16 Drawing Sheets

(5 of 16 Drawing Sheet(s) Filed in Color)

(51) Int. Cl.
  *H04N 13/20* (2018.01)
  *G06N 3/08* (2006.01)
  *G06T 3/40* (2006.01)
  *G06T 17/00* (2006.01)

(52) U.S. Cl.
  CPC ............. *G06T 17/00* (2013.01); *H04N 13/20* (2018.05); *G06T 2207/10012* (2013.01); *G06T 2207/10024* (2013.01); *G06T 2207/10028* (2013.01); *G06T 2207/20081* (2013.01); *G06T 2207/20084* (2013.01); *G06T 2210/12* (2013.01)

(58) Field of Classification Search
  CPC . G06T 2207/10024; G06T 2207/10028; G06T 2207/20081; G06T 2207/20084; G06T 2210/12; H04N 13/20; G06N 3/084
  See application file for complete search history.

(56) References Cited

U.S. PATENT DOCUMENTS

| | | | | |
|---|---|---|---|---|
| 9,418,475 | B2* | 8/2016 | Medioni | G06T 7/00 |
| 9,436,987 | B2* | 9/2016 | Ding | G06T 15/10 |
| 9,589,362 | B2* | 3/2017 | Sarkis | G06T 17/00 |
| 9,866,815 | B2* | 1/2018 | Vrcelj | G06T 7/12 |
| 9,904,867 | B2* | 2/2018 | Fathi | G06V 20/647 |
| 9,911,242 | B2* | 3/2018 | Sundaresan | H04N 1/60 |
| 9,912,862 | B2* | 3/2018 | Peruch | G01B 11/00 |
| 10,078,913 | B2* | 9/2018 | Rondao Alface | H04N 13/239 |
| 10,304,203 | B2* | 5/2019 | Forutanpour | G06T 5/005 |
| 10,354,411 | B2* | 7/2019 | Fu | G06T 7/11 |
| 10,430,641 | B2* | 10/2019 | Gao | B60R 11/04 |
| 10,452,789 | B2* | 10/2019 | Madmony | G06F 30/00 |
| 10,579,875 | B2* | 3/2020 | Dal Mutto | G06K 9/6267 |
| 10,636,219 | B2* | 4/2020 | Steinbrücker | G06T 15/405 |
| 10,699,421 | B1* | 6/2020 | Cherevatsky | G06K 9/623 |
| 10,733,798 | B2* | 8/2020 | Wagner | G06T 7/246 |
| 10,817,752 | B2* | 10/2020 | Kehl | G06V 20/58 |
| 10,825,217 | B2* | 11/2020 | Ulusoy | G06T 7/11 |
| 10,930,074 | B2* | 2/2021 | Fu | G06V 40/165 |
| 10,937,178 | B1* | 3/2021 | Srinivasan | G06T 7/521 |
| 10,937,188 | B2* | 3/2021 | Malisiewicz | G06N 3/08 |
| 10,970,518 | B1* | 4/2021 | Zhou | G06K 9/6232 |
| 11,244,189 | B2* | 2/2022 | Fathi | G06T 17/00 |
| 2016/0196659 | A1* | 7/2016 | Vrcelj | G06K 9/6215 382/154 |
| 2017/0154127 | A1* | 6/2017 | Madmony | G06F 16/5854 |
| 2018/0137642 | A1 | 5/2018 | Malisiewicz et al. | |
| 2019/0108396 | A1* | 4/2019 | Dal Mutto | G07G 1/0063 |
| 2019/0213389 | A1* | 7/2019 | Peruch | G06V 10/751 |
| 2019/0259202 | A1* | 8/2019 | Taubin | G06T 17/00 |
| 2020/0320327 | A1* | 10/2020 | Fathi | G06V 10/267 |

OTHER PUBLICATIONS

International Search Report and Written Opinion for International Application No. PCT/US19/68144, dated Apr. 8, 2020, 10 pages.

Goodfellow, I., et al., Generative Adversarial Nets, In Advances in Neural Information Processing Systems, pp. 2672-2680 (online), Jun. 10, 2014 (retrieved on Mar. 9, 2020) http://citeseerx.ist.psu.edu/viewdoc/download?doi=10.1.1.747.1316&rep=rep1&type=pdf.

Zhang, C., Generative Adversarial Modeling of 3D Shapes, Department of Electrical Engineering and Computer Science, Massachusetts Institute of Technology. Doctoral Dissertation (online), Jun. 2018 (retrieved on Mar. 9, 2020) https://dspace.mit.edu/bitstream/handle/1721.1/119694/1078150040-MIT.pdf?sequence=1&isAllowed=y, 59 pages.

Schiebener, D., et al., Heuristic 3D Object Shape Completion based on Symmetry and Scene Context, In 2016 IEEE/RSJ International Conference on Intelligent Robots and Systems (IROS), pp. 74-81, IEEE (online), Dec. 1, 2016 (retrieved on Mar. 9, 2020) https://h2t.anthropomatik.kit.edu/pdf/Schiebener2016.pdf.

Long, J., et al., Fully Convolutional Networks for Semantic Segmentation, In Proceedings of the IEEE conference on computer vision and pattern recognition, pp. 3431-3440 (online), May 24, 2016 (retrieved on Mar. 9, 2020) https://www.cv-foundation.org/openaccess/content_cvpr_2015/papers/Long_Fully_Convolutional_Networks_2015_CFPR_paper.pdf.

Su, H., et al., Multi-view Convolutional Neural Networks for 3D Shape Recognition, In Proceedings of the IEEE International conference on computer vision, pp. 945-953 (online), Feb. 18, 2016 (retrieved on Mar. 9, 2020) https://www.cy-foundation.org/openaccess/content_iccv_2015/papers/Su_Multi-View_Convolutional_Neural_ICCV_2015_paper.pdf.

* cited by examiner

SYSTEMS AND METHODS FOR OBJECT DIMENSIONING BASED ON PARTIAL VISUAL INFORMATION

CROSS-REFERENCE TO RELATED APPLICATION(S)

This application claims the benefit of U.S. Provisional Patent Application No. 62/783,141, filed in the United States Patent and Trademark Office on Dec. 20, 2018, the entire disclosure of which is incorporated by reference herein.

FIELD

Aspects of embodiments of the present invention relate to systems and methods for automatically estimating or determining the physical dimensions of an object based on partial visual information about the object.

BACKGROUND

Measuring or estimating the dimensions of objects, including the volumes of objects, is a common task in fields such as resource planning and logistics. For example, when loading boxes into one or more trucks, estimates of the sizes and shapes of the boxes can help in the efficient distribution of the boxes among the different trucks to reduce or minimize empty space in the trucks. As another example, freight or shipping companies may bill their customers in accordance with the dimensions (and mass or weight) of the packages to be shipped.

As another example, mail order retailers may be interested in identifying the correctly sized box for shipping various retail goods. While many of these goods may be cuboidal in shape (e.g., because they are sold in boxes), many other goods (such as a bottle of laundry detergent or a gardening trowel) may have irregular shapes. To reduce shipping costs, these mail order retailers may desire to find the minimal sized box that will contain the items to be shipped as part of a particular customer's order.

Comparative techniques for measuring the dimensions of an object by physically placing a measuring device, such as a tape measure or a ruler, against the object are generally time consuming and expensive.

SUMMARY

Aspects of embodiments of the present disclosure relate to systems and methods for automatically measuring or estimating the dimensions and/or volume of objects based on partial visual information about the object.

According to one embodiment of the present invention, a method for estimating tightly enclosing bounding boxes includes: controlling, by a computing system, a scanning system including one or more depth cameras to capture visual information of a scene including one or more objects; detecting, by the computing system, the one or more objects of the scene based on the visual information; singulating, by the computing system, each of the one or more objects from the frame of the scene to generate one or more 3D models corresponding to the one or more objects, the one or more 3D models including a partial 3D model of a corresponding one of the one or more objects; extrapolating, by the computing system, a more complete 3D model of the corresponding one of the one or more objects based on the partial 3D model; and estimating, by the computing system, a tightly enclosing bounding box of the corresponding one of the one or more objects based on the more complete 3D model.

The scanning system may include one or more color cameras separate from the one or more depth cameras.

The one or more depth cameras may include: a time-of-flight depth camera; a structured light depth camera; a stereo depth camera including at least two color cameras; a stereo depth camera including: at least two color cameras; and a color projector; a stereo depth camera including at least two infrared cameras; or a stereo depth camera including: a color camera; a plurality of infrared cameras; and an infrared projector configured to emit light in a wavelength interval that is detectable by the plurality of infrared cameras.

The detecting the one or more objects in the scene may include separating the one or more objects from depictions of background and ground plane in the visual information.

The extrapolating the more complete 3D model may include supplying the partial 3D model to a generative model trained to predict a generated 3D model based on an input partial 3D model, the more complete 3D model including the generated 3D model.

The generative model may include a conditional generative adversarial network.

The extrapolating the more complete 3D model may include searching an inventory of 3D models for a model matching the partial 3D model and to output the model matching the partial 3D model as the more complete 3D model.

Each of the 3D models of the inventory may be associated with a corresponding descriptor in feature space, and the searching the inventory of 3D model may include: extracting a descriptor of the partial 3D model by supplying the partial 3D model to a feature extractor including a convolutional neural network; and identifying the model matching the partial 3D model in accordance with a highest similarity between the descriptor of the partial 3D model and the descriptors of the 3D models of the inventory.

The extracting the descriptor of the partial 3D model may include: defining a bounding box around the 3D model; voxelizing the partial 3D model to compute a plurality of voxels; and supplying the voxels to the convolutional neural network.

The extracting the descriptor of the partial 3D model may include: rendering a plurality of 2D views of the partial 3D model; extracting feature vectors from the 2D views of the partial 3D model by supplying the plurality of 2D views to a first stage convolutional neural network; and combining the feature vectors to generate the descriptor.

The feature vectors may be combined using max pooling.

The extrapolating the more complete 3D model may include: classifying the partial 3D model to compute a matching classification; loading one or more heuristic rules for generating more complete 3D models for the matching classification; and generating the more complete 3D model from the partial 3D model in accordance with the one or more heuristic rules.

The one or more heuristic rules may include one or more assumed axes of symmetry of the more complete 3D model based on the matching classification, or a canonical general shape of the more complete 3D model based on the matching classification.

The one or more objects may include a plurality of objects, and the singulating each the one or more objects from the frame of the scene may include singulating the plurality of objects by applying an appearance-based segmentation to the visual information.

The one or more objects may include a plurality of objects, and the singulating each the one or more objects from the frame of the scene may include singulating the plurality of objects by applying semantic segmentation to the visual information.

The applying semantic segmentation may include supplying the visual information to a trained fully convolutional neural network to compute a segmentation map, wherein each partial 3D model may correspond to one segment of the segmentation map.

The method may also include associating the tightly enclosing bounding box with an item descriptor.

According to one embodiment of the present invention, a system for estimating tightly enclosing bounding boxes includes: a scanning system including one or more depth cameras; a processor configured to control the scanning system; and memory storing instructions that, when executed by the processor, cause the processor to: control the one or more depth cameras to capture visual information of a scene including one or more objects; detect the one or more objects of the scene based on the visual information; singulate each the one or more objects from the frame of the scene to generate one or more 3D models corresponding to the one or more objects, the one or more 3D models including a partial 3D model of a corresponding one of the one or more objects;

extrapolate a more complete 3D model of the corresponding one of the one or more objects based on the partial 3D model; and estimate a tightly enclosing bounding box of the corresponding one of the one or more objects based on the more complete 3D model.

The instructions to extrapolate the more complete 3D model may include instructions that, when executed by the processor, cause the processor to supply the partial 3D model to a generative model trained to predict a generated 3D model based on an input partial 3D model, the more complete 3D model including the generated 3D model.

The generative model may include a conditional generative adversarial network.

The instructions to extrapolate the more complete 3D model may include instructions that, when executed by the processor, cause the processor to search an inventory of 3D models for a model matching the partial 3D model and to output the model matching the partial 3D model as the more complete 3D model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
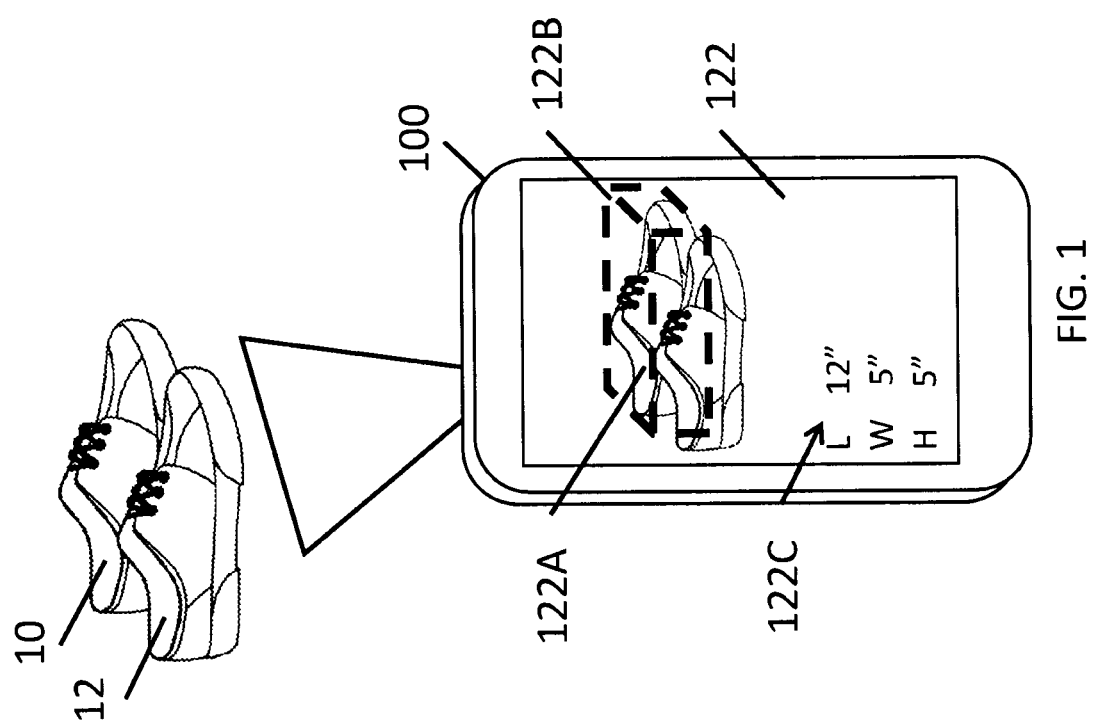
FIG. 1 is a schematic depiction of the measurement of an object a system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for automatically estimating physical dimensions of objects in a scene. Some aspects of embodiments of the present invention relate to "contactless" measurements of physical objects, wherein a depth camera captures one or more depth images of an object and the dimensions of an object (e.g., length, width, height, and volume), or a bounding box thereof are estimated from the one or more depth images.

Object dimensioning is the task of estimating the 3D spatial extent of an object. One aspect of embodiments of the present invention relate to computing an estimate of the minimum enclosing bounding box (MEBB) for a given object. For the sake of convenience, as used herein, the term MEBB will be used to refer to a tight bounding box. In order to perform such measurement, an acquisition system encompassing one or more cameras can be used. Depth cameras are particularly suited for this type of task, given their intrinsic capability of acquiring 3D geometry. Examples of techniques for performing volumetric box fitting using an acquisition system, such as by finding a tight bounding box around the object, are described in U.S. patent application Ser. No. 16/240,691, "SYSTEMS AND METHODS FOR VOLUMETRIC SIZING," filed in the United States Patent and Trademark Office on Jan. 4, 2019, and U.S. Provisional Patent Application No. 62/613,957, filed in the United States Patent and Trademark Office on Jan. 5, 2018, the entire disclosures of which are incorporated by reference herein.

While the computation of the MEBB of an object is relatively straightforward from a full 3D model of an object, in many cases only partial information is available for an object. (For the sake of clarity, the term "3D model," as used herein, is inclusive of point clouds and 3D meshes.) For example, if only a frontal acquisition of the shape of a target object is performed, or if the target object is occluded by other objects in the scene, then only a partial 3D model of an object can be acquired (e.g., the acquired 3D model may encompass only a portion of the object), and thereby making it difficult to estimate the MEBB of an object (e.g., the MEBB of a partial 3D model of an object is likely to underestimate the actual volume of the object). As such, aspects of embodiments of the present invention relate to systems and methods for estimating the content of the missing parts of the 3D model to compute an estimated volume of the entire object. Some aspects of embodiments of the present invention relate to the use of object identification and classification techniques to improve the accuracy of the estimated or predicted shape of the missing parts in the 3D model.

FIG. 1A is a schematic depiction of the measurement of an object a system according to one embodiment of the present invention. As shown in FIG. 1A, a depth camera system 100 captures images of a target object 10, here one shoe of a pair of shoes. As shown in FIG. 1A, the target shoe 10 is partially occluded by another object 12 (in this case, another shoe). in some embodiments of the present invention, the depth camera system 100 may include a display device 122 for displaying the measurements captured by the depth camera system 100. In other embodiments of the present invention, the display device 122 may be physically separate from the cameras of the depth camera system 100, such as in the case of a separate reporting or monitoring system. As shown in FIG. 1, the display device 122 displays an outline of a minimum enclosing bounding box (MEBB) 122B around a depiction 122A of the target object 10, as well as dimensions 122C of the MEBB 122B for the target object.

In some circumstances, the system 100 may be in communication with an electronic scale or electronic balance that the object 10 is resting on, and the measured mass or weight 240 of the object 10 may also be shown on the display 122 of the system 100. In some circumstances, the weight or mass of the object may have been previously measured and stored in a memory (e.g., in a database) and retrieved for display on the display device 122.

In some embodiments of the present invention, the depth camera system 100 is able to acquire color information (e.g., information about the colors of the surface of an object or its surface "texture") and geometric information (e.g., information about the size and shape of an object), such as an RGB-D (red, green, blue, and depth) camera. In the reminder of the disclosure, the term "RGB-D camera" is used to refer to such a system that can acquire color and geometric information, without loss of generality.

Like a regular camera, an RGB-D camera takes "pictures" of a scene by means of central optical projection. Whereas regular cameras can only measure the color of the light reflected by any visible point on the surface of an object, RGB-D cameras can also measure the distance ("depth") to the same points on the surface. By measuring the depth of a surface point visible at a pixel p, an RGB-D camera is able to compute the full 3-D location of this point. This is because a pixel p characterizes the single line of sight to the surface point; the depth along a line of sight determines the location where the line of sight intersects the surface point. The line of sight through pixel p can be computed from the camera's intrinsic parameters, which can be calibrated using standard procedures.

From a single snapshot (e.g., from a set of images captured from a particular pose of the RGB-D camera with respect to a scene) the RGB-D camera can produce a "depth map" (or "point cloud") from the disparity maps generated from the individual images captured by each of the 2-D cameras of the RGB-D camera. A depth map or depth image includes a set of 3-D locations (which may be defined with respect to the camera's reference frame) of the surface points of the scene that are visible from the depth camera. Each pixel in the depth map may be associated with a color (e.g., represented by a triplet of red (R), green (G), and blue (B) values) as captured for the particular pixel by the color camera.

In some embodiments of the present invention, the scanning system 100 is implemented in a handheld device. In this disclosure, the term "handheld device" refers to a device that can be comfortably held and manipulated with one or two hands, such as a smartphone, a tablet computer, or a purpose-specific scanner similar in size and shape to a portable barcode scanner with an attached display (or, alternatively, a smartphone with an attached handle and trigger).

In some embodiments of the present invention, the scanning system 100 is implemented as stationary device, such as one or more depth cameras rigidly mounted to a frame or other support structure and arranged to image objects on a conveyor belt or at a scanning station (e.g., a weighing location), and processing of the images captured by the one or more depth cameras may be performed by a processor and memory that are connected to the one or more depth cameras over a communication network (e.g., a local area network).

As noted above, aspects of embodiments of the present invention relate to systems and methods to compute the dimensions of a bounding box or minimal bounding box that would encompass an object. This may be thought of as a box that could be used to package the object, where the dimensions of the box are computed from observations of the object taken with a depth camera system 100. In the case of a minimal bounding box, the dimensions of a box minimize some particular characteristic, such as the volume, area, or perimeter of the bounding box such that encompasses the entirety of the object.

Depth Camera Hardware

In some embodiments of the present invention, the range cameras 100, also known as "depth cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 2:
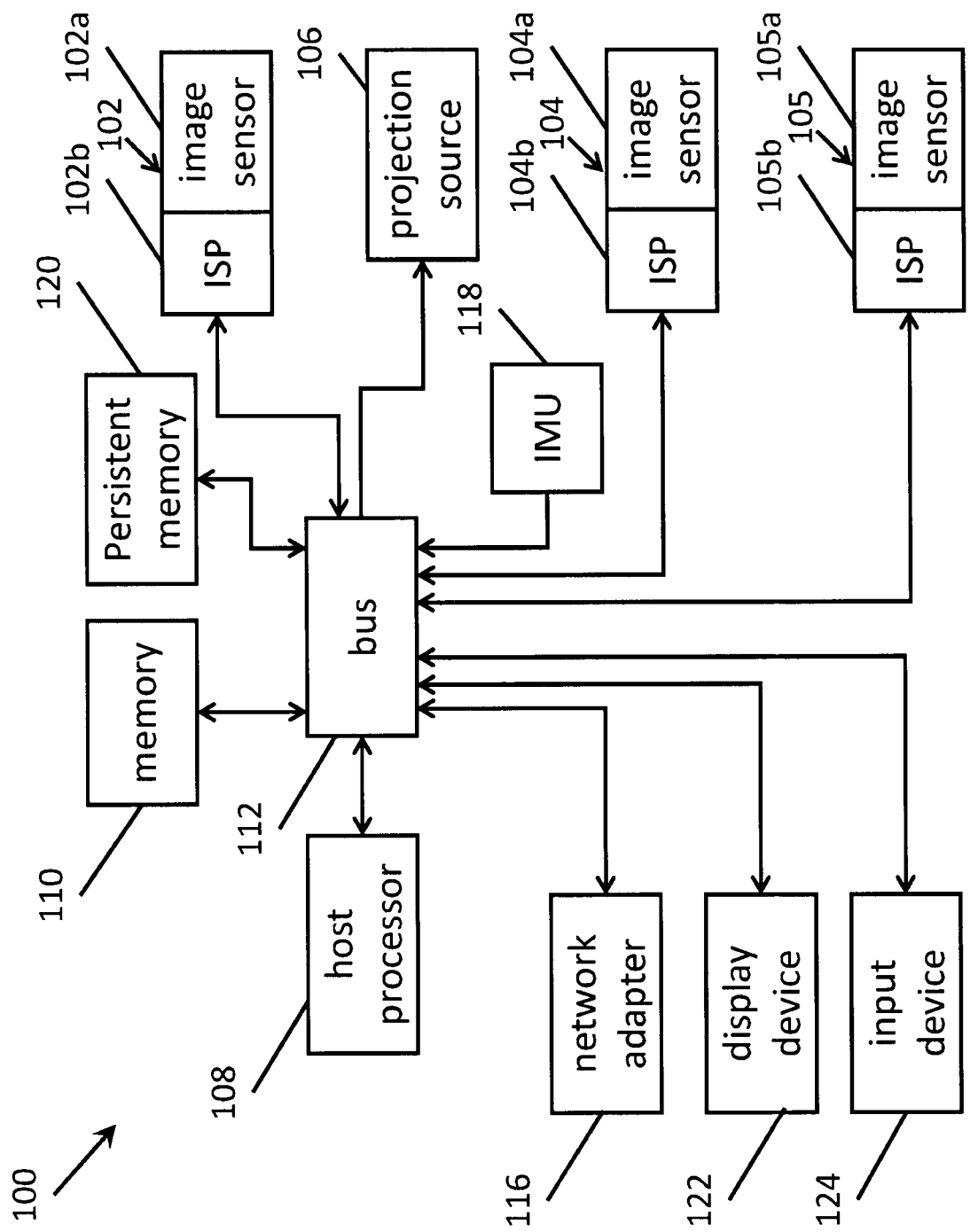
FIG. 2 is a block diagram of a stereo depth camera system according to one embodiment of the present invention.

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general-purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller. In some embodiments, the depth camera system 100 further includes a display device 122 and one or more user input devices 124 (e.g., a touch sensitive panel of the display device 122 and/or one or more physical buttons or triggers).

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors. In some embodiments of the present invention, the image sensors 102a and 104a are infrared light (IR) sensors. In some embodiments (such as those in which the image sensors 102a and 104a are IR sensors) the depth camera 100 may include a third camera 105 including a color image sensor 105a (e.g., an image sensor configured to detect visible light in the red, green, and blue wavelengths, such as an image sensor arranged in a Bayer layout or RGBG layout) and an image signal processor 105b.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras.

In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein. Such a three-camera system may also include an infrared illuminator configured to emit light in a wavelength interval that is detectable by the infrared cameras (e.g., 840-860 nm).

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. Arrangements in which two cameras 102 and 104 are arranged with a projection source 106 in this manner is sometimes referred to as "active stereo." In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Depth computations may fail in some region areas due to multiple factors, including: the mechanism used to compute depth (triangulation, with or without an active illuminator, or time of flight); the geometry of the scene (such as the angle between each surface element and the associated line of sight, or the presence of partial occlusion which may impede view by either sensor in a stereo system); and the reflectivity characteristics of the surface (such as the presence of a specular component which may hinder stereo matching or reflect away light from a projector, or a very low albedo causing insufficient light reflected by the surface). For those pixels of the depth image where depth computation fails or is unreliable, only color information may be available.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Computing the Minimum Enclosing Bounding Box (MEBB) for an Object

In the simple case where an object is resting on a table and is not occluded by other objects, approaches described in U.S. patent application Ser. No. 16/240,691, "SYSTEMS AND METHODS FOR VOLUMETRIC SIZING," filed in the United States Patent and Trademark Office on Jan. 4, 2019 (incorporated by reference above) may be applied to computing the volume of the object. Aspects of this technique will be summarized below.

Aspects of some embodiments of the present invention assume that the object or box to be measured lies on the ground, and determines the size of an enclosing cuboid (e.g., rectangular prism) that itself has one face that lies on the ground (e.g., has one face that is parallel to and in contact with the ground). In most practical scenarios, this assumption is not particularly limiting, because, generally speaking, a box is physically more stable when resting on one of its faces as opposed to on one of its edges or corners, and other objects may have one or more natural orientations that would also correspond to the orientations of the objects when packaged in a box (e.g., televisions and computer displays, containers of liquids, and the like). Accordingly, the majority of boxes and objects encountered in practice are oriented with one face against the ground and, if they are not, can be manipulated to place one face on the ground.

For the sake of convenience, the surface on which the object rests will be referred to herein as the "ground" or "ground plane" without limitation to a particular actual height of a horizontal surface in a particular environment. For example, embodiments of the present invention are equally applicable in situations in which the object or box lies on an elevated horizontal surface, such as a table, an elevated weighing scale, the bed of a truck, and the like. Furthermore, embodiments of the present invention do not require the ground or ground plane to be completely horizontal (e.g., perpendicular to the direction of gravity), but may also be applicable in circumstances where the ground or ground plane is slightly tilted with respect to the horizontal plane.

By only computing enclosing boxes with one side lying on the ground, embodiments of the present invention speed up computation considerably with respect to comparative techniques. This allows embodiments of the present invention to provide rapid measurements of the dimensions of an object (e.g., on the order of seconds or less, rather than minutes), thereby providing easy usability in dynamic working conditions such as a warehouse or shipping center.

In addition, some comparative techniques consider 3-D data (e.g., a computed point cloud) without reference to the color of the surface points. In contrast, aspects of embodiments of the present invention relate to use of color information in addition to depth information. Color information is useful in situations in which depth cannot be computed reliably over the whole surface of the object.

Aspects of embodiments of the present invention will be described below with respect to two different variants, referred to herein as "modules" for computing the dimensions of a box enclosing an object seen by an RGB-D camera. The first module operates on generic objects (e.g., without making assumptions about the shape of the object). The second module is specialized for objects that have a cuboidal (e.g., box) shape. Both modules return the parameters (e.g., length, width, and height) of a tight (e.g., minimal) box lying on the ground that encloses the object imaged by the RGB-D camera.

Objects can typically be characterized by both specific surface colors (e.g., different colors on different portions of the surface of the object) and geometry (although these may be subject to variation between different instances of the same object, such as variations in the surface shape of a soft handbag or duffel bag based on the locations and depth of folds in the material). This type of information can be used to estimate the size and dimensions of the objects themselves, as described in more detail below.

The color and geometry of an object can be obtained using specialized hardware such as an RGB-D camera of a depth camera system 100, as described above.

An RGB-D camera according to some embodiments includes one or more color cameras (e.g., color camera 105), which acquire the color information of a scene imaged by the one or more color cameras and by one or more depth cameras (e.g., cameras 102 and 104), which acquire the geometry information (e.g., using infrared light). In some embodiments, the RGB-D camera includes one or more color cameras and one or more Infra-Red (IR) cameras, which, coupled with an IR structured-light illuminator (e.g., projection source 106), constitute the depth camera. The case in which there are two IR cameras and an IR structured-light illuminator is called active stereo.

The color camera and the depth camera can be synchronized and geometrically calibrated, allowing it to capture sequences of frames that are constituted by color images and corresponding depth maps, which can be geometrically aligned (e.g., each pixel or location of a depth map can be correlated with a corresponding color from a color image, thereby allowing capture of the surface colors of the scene). The combination of a depth map and a color image captured at substantially the same time as the depth map may be referred to as a "frame" of data. In this case, a color image with a depth map (or "depth image") may be called an RGB-D frame, which contains color (RGB) and depth (D) information, as if both were acquired by a single camera with a single shutter and a single vantage point (even though the individual cameras 102, 104, and 105 are physically located in slightly different locations).

As noted above, the depth camera system 100 may include an Inertial Measurement Unit (IMU) 118, which include an accelerometer (e.g., a 3-axis accelerometer) that is synchronized with the RGB-D camera at either a software level or at a hardware level and that can be optionally calibrated with the RGB-D camera in terms of their relative spatial locations (e.g., the IMU 118 may be rigidly connected to the cameras 102, 104, and 105). Accordingly, the IMU 118 can provide information about the acceleration and/or orientation of the depth camera system 100, and thereby provide information about the orientation of the depth camera system 100 relative to the captured depth frames. For example, the IMU 118 can be used to identify which direction in the captured depth frame is "down" (in the direction of gravity).

The various operations according to embodiments of the present invention, as discussed in more detail, below may be performed using one or more computing devices configured to receive the depth frames captured by the depth camera system 100. In some embodiments, all of the operations are performed in a single computing device (e.g., the host processor 108 and the memory 110 of the depth camera system 100). In other embodiments of the present invention, the computed RGB-D frames from the depth camera system are analyzed by a processor and memory of a separate computing device or a separate processor and memory physically coupled to the depth camera system. In addition, various operations may be implemented using one or more of general-purpose or specific-purpose processing units such as a general purpose central processing unit (CPU), a graphical processing unit (GPU), a field programmable gate array (FPGA), and/or an application specific integrated circuit (ASIC), which may store data in memory (e.g., dynamic memory and/or static memory) and receive and/or transmit data through input/output (I/O) interfaces (e.g., universal serial bus or USB, serial) and networking interfaces (e.g., wireless local area networks such as IEEE 802.11b/g/n/ac WiFi, wired local area networks such as IEEE 802.3 Ethernet, 3G/4G cellular connectivity, and Bluetooth®) to execute a set of instructions in order to perform volumetric box fitting in accordance with embodiments of the present invention.

In some embodiments of the invention, other sensors are connected to the computing device through the I/O or networking interfaces. For example, an electronic scale may provide measurements of the weight of the object, and a barcode decoding system may provide an identifier (e.g., a Universal Product Code or UPC) of the object in order to allow metadata about the object to be retrieved from a database or other data store. In some embodiments, the barcode decoding system may use an image of a barcode captured by a color camera of the depth cameras system (e.g., applying image rectification to a barcode appearing in a portion of the color image).

Figure 3:
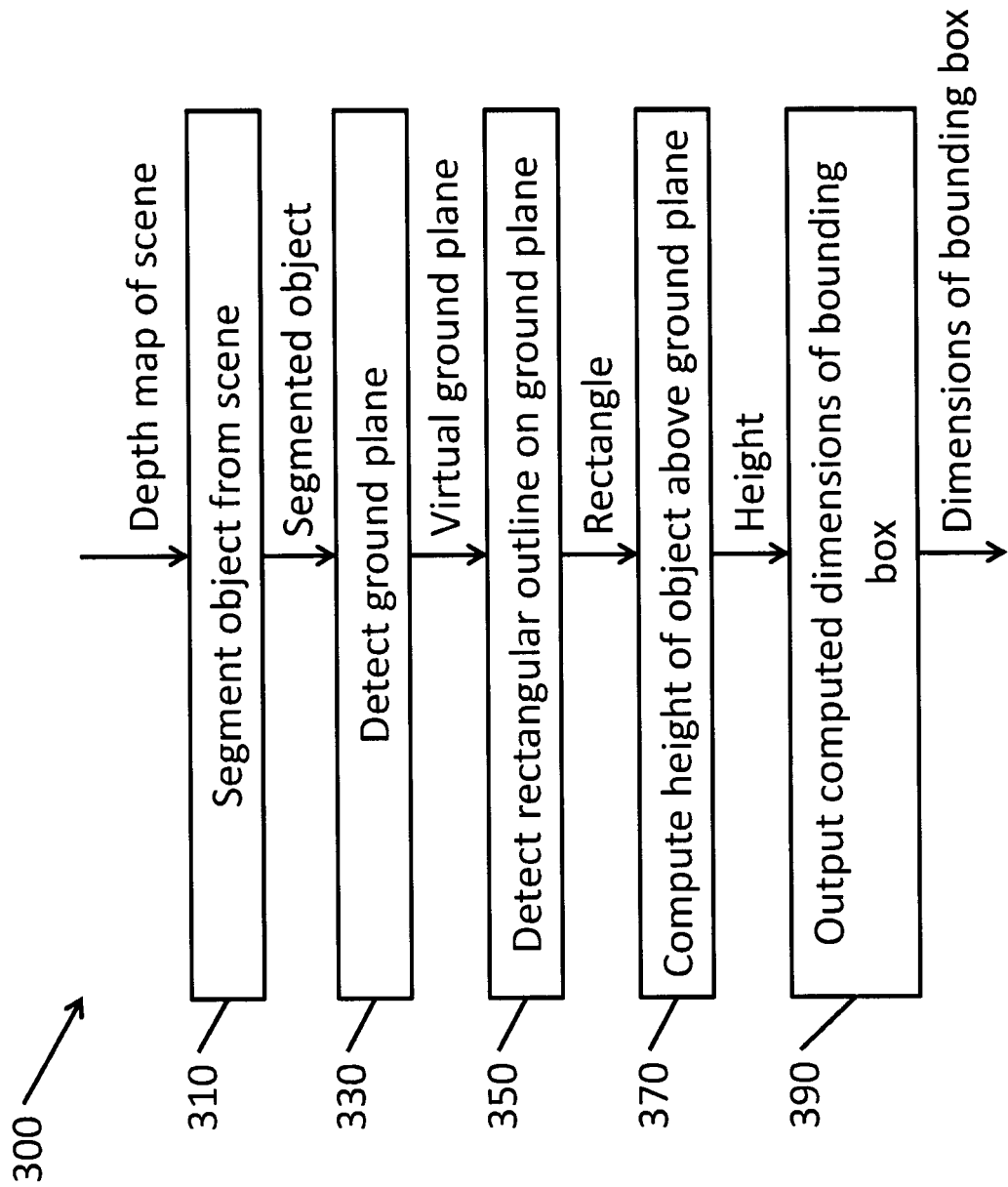
FIG. 3 is a flowchart of a method for measuring dimensions of object according to one embodiment of the present invention.

As noted above, some aspects of embodiments of the present invention relate to computing bounding boxes of objects (e.g., arbitrary objects). FIG. 3 is a flowchart of a method for measuring dimensions of object according to one embodiment of the present invention.

In some embodiments of the present invention, the process begins with a depth map of a scene including an object and proceeds with segmenting 310 the object from the scene, detecting 330 the ground plane that the object is resting on, detecting a 350 rectangular outline of the object, projected onto the ground plane, computing 370 a height of the object above the ground plane, and outputting 390 the computed dimensions of the bounding box surrounding the object. The depth map of the scene may be captured using a depth camera system 100 as described above (e.g., an RGB-D camera). As noted above, for the sake of convenience, the operations will be described herein as being performed by the host processor 108 of the depth camera system 100, but embodiments of the present invention are not limited thereto and, in some embodiments, various operations may be performed by one or more other computing devices such as a CPU, a GPU, an FPGA, and/or an ASIC, where the one or more other computing devices may be integrated into the same physical device as the depth camera system 100 (e.g., enclosed in the same housing and/or located on the same circuit board) and/or from the depth camera system 100 (e.g., in communication with the depth camera system through one or more of the I/O interfaces and/or the network interfaces 116).

In operation 310, the processor 108 segments the object from the scene. In some embodiments, the object is separated or "segmented" from the other objects in the scene (e.g., the pixels corresponding to the clutter 12 may be ignored in the following operations or deleted from the captured depth map). The object may be resting on a ground (or horizontal surface) 14.

According to some embodiments of the present invention, the portion of the 3-D model (e.g., the pixels of the RGB-D frame or the points of the point cloud) corresponding to the object 10 are identified by selecting the points of the point cloud (or vertices of the 3-D model) or the pixels of the RGB-D frame that are closest to the viewpoint of the depth camera system (in some embodiments, this determination is also be weighted in accordance with how close the points are to the center of the image, in order to remove nearby clutter at the edges of the image). This is based on the assumption that the object of interest 10 will generally be the object in the scene that is closest to the camera (e.g., in the foreground). In some embodiments of the present invention, a reticle 250 (or crosshairs) may be shown in the view, and the pixels under the crosshairs are selected as initial points corresponding to the object of interest 10. The reticle 250 can improve usability of the system by providing the user with a visual cue for specifying which particular portions of the view correspond to the object of interest 10, rather than relying on a heuristic by the system.

Once initial points or pixels of the object of interest 10 have been selected, in some embodiments of the present invention, a "flood fill" operation may be performed to select the remaining portions of the object that are visible in the scene. This is similar to a flood fill operation in 2-D graphics, where an initial pixel may be selected and neighboring pixels that are within a threshold distance in color space (e.g., similarly colored pixels) are added to the set of selected pixels, and the process iteratively adds neighboring pixels that satisfy the condition, until no more pixels can be added to the selection.

In more detail, in one embodiment of the present invention, the 3-D flood fill operation begins by identifying initial points of the object, and then adding pixels that are close enough to be considered "continuous" and adjacent to currently selected pixels in 3-D space. For example, referring to FIG. 1B, the corner of the box may be the identified as initial points of the object in view of being the closest to the camera and closest to the center of the image. Points or pixels near the corner of the box closest to the camera will be close to (and considered "continuous" with) the point corresponding to the corner of the box. Likewise, pixels along the top, front, and side surface of the box will be considered "continuous" and close to their adjacent pixels in the scene. On the other hand, the 3-D position of points of the clutter 12 behind the box 10 will be "discontinuous" with the top surface of the box, because there will be a large change in the range (e.g., distance from the depth camera system 100) when transitioning from the top surface of the box 10 to a surface of the clutter 12.

Figure 4A:
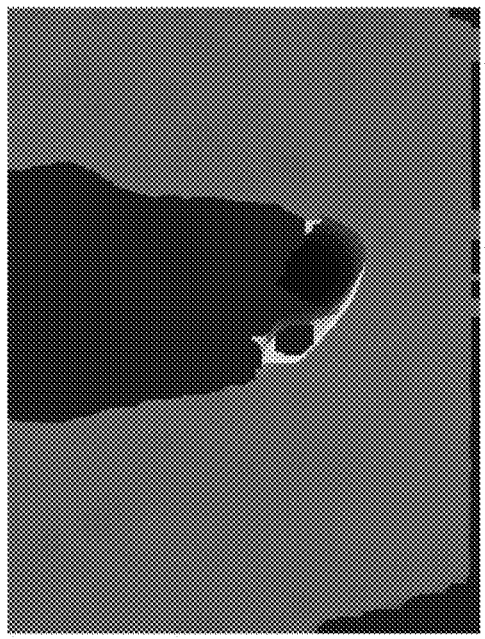
FIG. 4A is a depiction of a depth map of a scene depicting a bottle of laundry detergent on a table.

FIG. 4A is a depiction of a depth map of a scene depicting a bottle of laundry detergent on a table. In the depth map, blue pixels represent longer distances, green and yellow pixels represent mid-range distances, and red pixels depict shorter distances. The bottle shown in FIG. 4A, can be segmented from the background based on discontinuity between the edges of the bottle in red and the adjacent pixels (corresponding to the table) in yellow and green.

In operation 330, the processor 108 detects a ground plane of the scene. As discussed above, the ground plane is assumed to be the substantially planar surface of the scene that the object of interest 10 is resting on a ground surface 14.

The correctness of the methods described herein relies on the computation of an accurate ground plane. In some embodiments, methods such as random sample consensus (RANSAC) are used to compute the model (in this case, a planar model) that is consistent with most observations (in this case, the 3-D points measured by the RGB-D camera). In some embodiments of the present invention, computing the ground plane uses data from a 3-axis accelerometer (or IMU 118) of the depth camera system 100, and geometrically calibrated with the depth camera system 100. When the IMU 118 is kept in a static position, it produces a triplet of numbers that represents the direction of the gravity vector (orthogonal to the ground plane). This automatically determines the orientation of the ground plane. The actual location of the ground plane can then be estimated from the captured 3-D depth map. For example, in some embodiments, the processor is controlled to select the closest plane to the camera that is consistent with the expected orientation of the ground plane determined by the IMU 118, such that all 3-D points measured from the depth camera system 100 are above this selected closest plane.

In some aspects of embodiments of the present invention, the points or pixels of the scene corresponding to the ground plane can be detected by following the pixels corresponding to the object downward (e.g., based on the "down" direction as detected by the IMU 118), and identifying all of the pixels that are at the same height (e.g., along a plane corresponding to the points on pixels around the base of the object 10), within a threshold value.

In some circumstances, sensor noise may cause the detected location of the ground plane to be unreliable, where the noise effects increase based on distance from the scanning device 100. Accordingly, in operation 330, a virtual ground plane is calculated by detecting the portion of the ground plane that is near the scanning device, and extending the detected near portion of the ground plane backward, rather than rely upon the sensor data for more distant portions of the ground plane. Techniques for calculating the virtual ground plane are described in more detail in U.S. patent application Ser. No. 16/240,691, "SYSTEMS AND METHODS FOR VOLUMETRIC SIZING," filed in the United States Patent and Trademark Office on Jan. 4, 2019 (incorporated by reference above).

In operation 350, the processor detects a rectangular outline of the object on the ground plane.

Figure 4B:
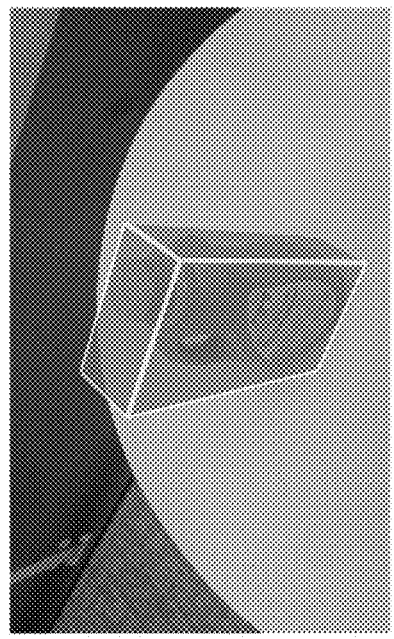
FIG. 4B is an orthogonal view of the depth map shown in FIG. 4A with the ground plane aligned perpendicular to the optical axis of the virtual camera.

FIG. 4B is an orthogonal view of the depth map shown in FIG. 4A with the ground plane aligned perpendicular to the optical axis of the virtual camera. The large region of lighter red represents the portion of the ground plane that was visible to the depth camera system 100 in FIG. 4A. The darker red portion of FIG. 4B corresponds to the portions of the ground plane that were occluded by the bottle when the depth map was captured. The brighter colored portions of the depth map near the center of FIG. 4B correspond to the bottle (these portions are depicted in yellow and blue because this particular orthogonal view is taken from "underneath" the ground plane), and these brighter colored portions represent the projection of the points of the object 10 onto the virtual ground plane. This process is equivalent to "smashing" all of the points of the depth map corresponding to the object 10 down to the ground plane (e.g., assuming that ground plane extends along the x-z axes of the 3-D model at the y coordinate of zero (0), this is equivalent to setting the y coordinates of all of the points of the object 10 to zero (0)).

Figure 4C:
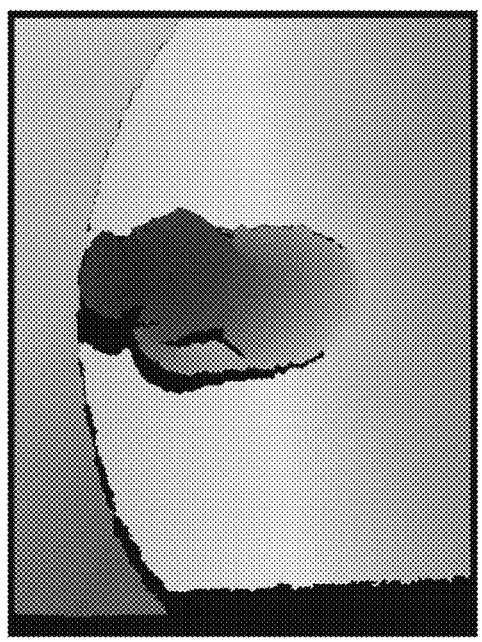
FIG. 4C depicts the vertically projected points of the object in white and the rest of the image in black, with a red rectangle on the ground plane that contains all the vertical projections of the object's surface points according to one embodiment of the present invention.

This results in a set of 2-D points that are defined in reference to a frame fixed to the ground plane. Projecting the points of a box with a face lying on the ground (and thus parallel to the ground plane), would generate a rectangular trace (likewise, the projection of any right prism standing on one of its bases would generate a trace shaped like its base). If a box encloses the object 10, then a rectangular trace bounding its vertically projected points should also contain all of the vertical projections of the object's surface points. FIG. 4C depicts the vertically projected points of the object 10 in white, the actual (ground truth) location of the object 10 in green, and the rest of the image in black, with a red rectangle on the ground plane that contains all the vertical projections of the object's detected surface points according to one embodiment of the present invention, and a yellow dotted rectangle on the ground plane that contains all the vertical projections of the object's actual surface points.

In some circumstances, other surfaces (e.g., from portions of clutter 12) in the scene besides the object 10 and the ground plane 14 are visible by the depth camera system 100, these points could be incorrectly considered in the computation of the enclosing box. In order to reduce the risk of these occurrences, in some embodiments, the processor computes the connected components of a graph defined on the ground plane, where the vertical projections of measured 3-D points of the surfaces in the scene, including the surfaces of the object, form the vertices of the graph, and two such vertices are connected by an edge if their distance is smaller than a threshold. Once the connected components of projection points have been computed, some embodiments, for example, keep the largest connected component, under the assumption that the object of interest occupies a larger portion in the image than other visible surfaces, thereby providing an alternative and/or additional technique for segmenting the object 10 from the clutter 12 in the scene (e.g., in additional to segmentation performed in operation 310).

Thus, an enclosing box for an object can be determined by determining a rectangle on the ground plane 14 that contains all the vertical projections of the object's surface points and extending the rectangle vertically to the top of the object. In some embodiments of the present invention, the enclosing box is a minimum volume enclosing box or minimum bounding box—in other words, the smallest box that encloses all of the points of the object, where "smallest" may refer to volume, area, or perimeter of the box, in accordance with particular application requirements (e.g., minimizing area to reduce the amount of packing material consumed versus minimizing volume to reduce the amount of space used to store or transport the object).

According to one embodiment, the minimum volume enclosing box can be computed by first determining, in operation 350, the minimum area rectangle enclosing the points of the object 10 projected onto the virtual ground plane. In some embodiments, a two-dimensional rotating calipers approach is used to compute the minimum area rectangle in linear time. The processor determines the height of this box in operation 370 as being equal to the maximum distance of any surface point of the object to the virtual ground plane. Note that the minimum area rectangle can be computed in a time linear to the number of enclosed points using standard rotating caliper methods. It is also possible to compute (again in linear time) the minimum surface enclosing box, by finding the minimum perimeter enclosing rectangle on the ground plane. Accordingly, aspects of embodiments of the present invention are able to compute a three-dimensional bounding box of an object in linear time with respect to the number of points; as opposed to in cubic time of the comparative techniques described above, thereby also enabling faster response (e.g., real-time or substantially real-time computations of three-dimensional bounding boxes).

Figure 4D:
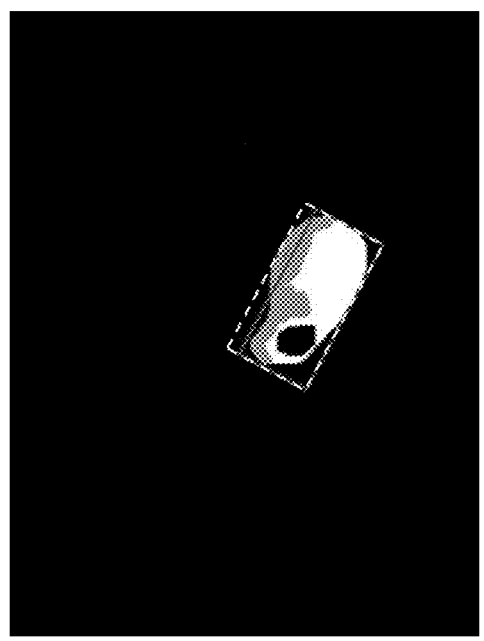
FIG. 4D is a color image of the scene including a bottle as depicted in the depth map of FIG. 4A, with a bounding box computed in accordance with embodiments of the present invention overlaid on the view of the bottle.

Accordingly, the dimensions of a box enclosing the object 10, including its length and width from the minimum area rectangle are computed in operation 350 and the height is computed in operation 370. In operation 390, the processor outputs the computed dimensions as shown, for example, as dimensions 230 in FIGS. 1B and 1C and as the outline 220 of a bounding box overlaid on a color image view of a scene as shown in FIGS. 1B and 1C. As another example of an output of the dimensions of the computed bounding box, FIG. 4D is a color image of the scene depicted in the depth map of FIG. 4A with a bounding box computed in accordance with embodiments of the present invention overlaid on the view of the bottle.

Capture of Portions of Objects in a Scene

While the approach described above with respect to FIGS. 3, 4A, 4B, 4C, and 4D is straightforward, it does not account for circumstances where there is missing information and partial occlusions of the target object. As seen in FIGS. 4A, 4B, 4C, and 4D, a depth map is able to acquire information only regarding the visible portion of the object (e.g., the front of the bottle), while there is no information about the back of the object. Therefore, when fitting a rectangle on the generated top view of the scene (see FIGS. 4B and 4C), the rectangle may fail to actually fit the entire object, as shown in FIG. 4C, above, when comparing red rectangle that is fit to the detected surface points of the object against the larger yellow dotted rectangle that is fit to the actual surface points of the object.

While this problem is present in the case of a single object acquired by a single depth (e.g., RGB-D) camera as described above, also applies to the case of multiple objects in the same scene and acquired in the same time, because there can also be mutual occlusions rather than merely self-occlusion of the back surfaces of the target objects.

Some aspects of embodiments of the present invention relate to coping with the self-occlusion problem by acquiring visual information from multiple view-points, however this operation can introduce system complexity (e.g., using multiple calibrated cameras) or may introduce process complexity (e.g., a single depth camera can acquire the object from different view-points at different times, such as by sweeping or panning the depth camera, and the captured visual information can then be aggregated).

Some aspects of embodiments of the present invention relate to estimating dimensions of objects by using higher level of information to extrapolate the geometry distribution of the parts of the object for which visual information has not been acquired. As on example, in the case of estimating the dimensions of the bottle shown in FIGS. 4A, 4B, 4C, and 4D, machine learning object classification techniques may be used to classify the object as a bottle, and stored heuristic rules regarding the typical symmetries of the shapes of bottles may be used to extrapolate the shape of the unobserved portion of the bottle (e.g., by duplicating the partial shape, inverting the partial shape, and aligning the two point clouds based on the known typical lines of symmetry).

Figure 5:
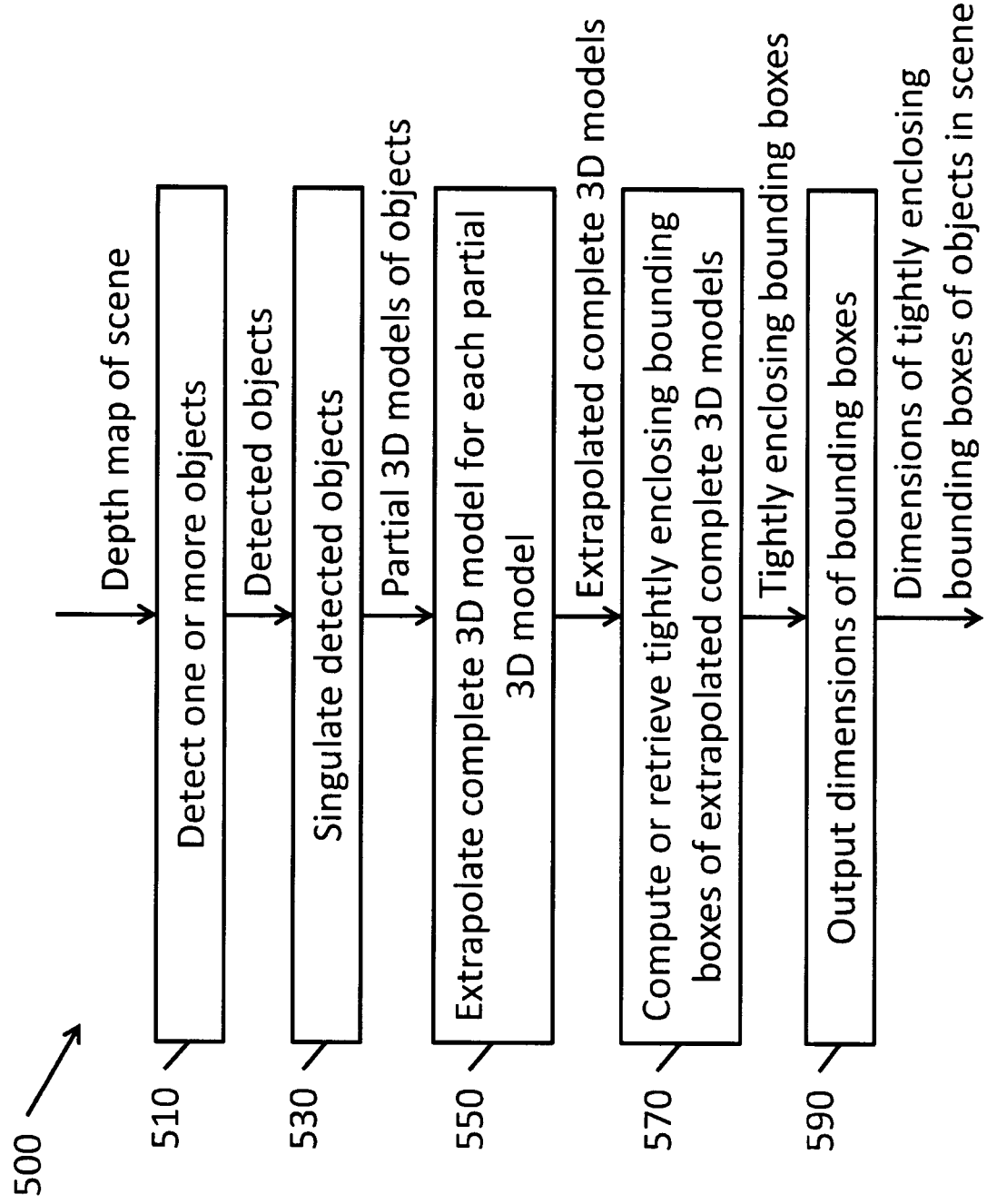
FIG. 5 is a flowchart of a method for computing dimensions of tightly enclosing bounding boxes of target objects in a scene according to one embodiment of the present invention.
Figure 6:
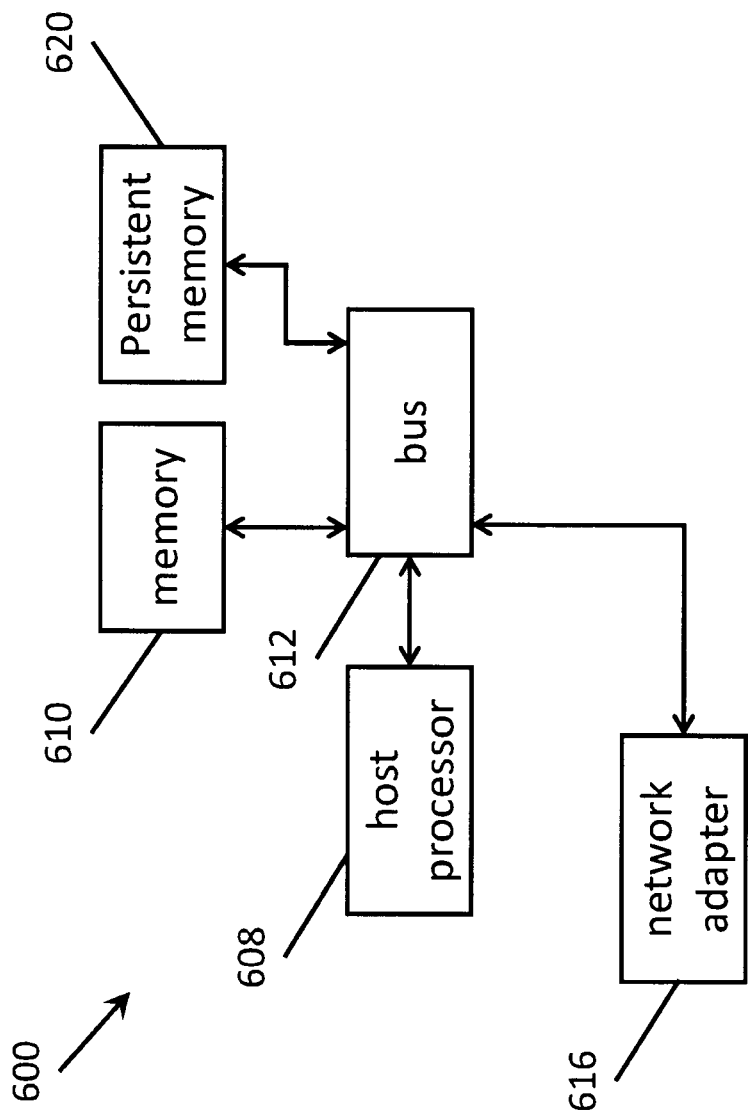
FIG. 6 is a block diagram of an analysis module configured to perform an analysis of an input visual information captured of a scene and to compute dimensions of tightly enclosing bounding boxes of target objects in the scene according to one embodiment of the present invention.

FIG. 5 is a flowchart of a method 500 for computing dimensions of tightly enclosing bounding boxes of target objects in a scene according to one embodiment of the present invention. FIG. 6 is a block diagram of an analysis module configured to perform an analysis of input visual information captured of a scene and to compute dimensions of tightly enclosing bounding boxes of target objects in the scene according to one embodiment of the present invention. In the embodiment shown in FIG. 6, the analysis module 600 is remote from the scanning system 100 and may include a host processor 608 connected to memory 610 via a bus 612. In addition, a network adapter 616 may be used to communicate with the scanning system 100. The analysis module 600 may further include persistent memory (e.g., flash memory) for storing information such as a database and object metadata and for storing logs of the results of analyses performed. In some embodiments of the present invention, the analysis module is implemented by the components of the scanning system 100, such as the processor 108 and memory 110 of the scanning system 100.

As shown in FIG. 5, at operation 510 the analysis module receives input visual information, which may include a depth map of a scene as captured by the scanning system 100 and detects one or more objects in the scene. The detection of the one or more objects may include, for example, identifying an object or objects near the center of the depth map (e.g., in some embodiments, the scanning system 100 may display crosshairs for a user to more clearly identify which target object or objects are to be dimensioned). The detection of the object may also include removing or discarding background pixels (e.g., portions of the depth map that indicate a depth or distance that is more than a threshold distance away from the scanning sensor). In addition, pixels corresponding to a ground plane on which the objects are resting may also be separated from the detected objects.

Figure 7B:
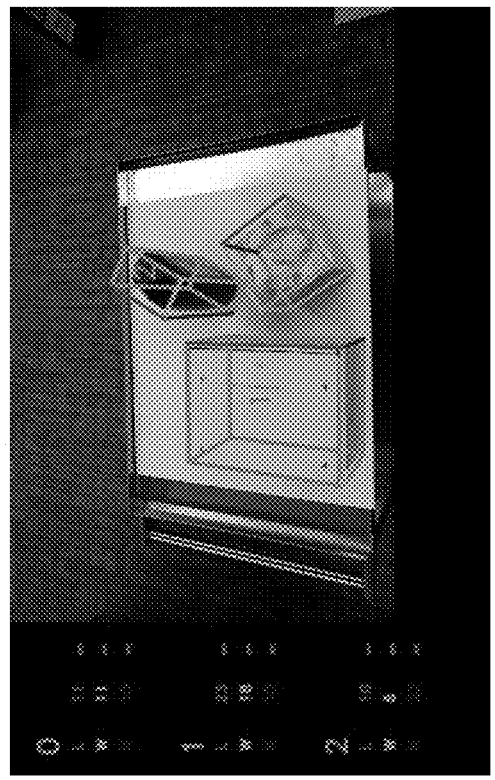
FIG. 7B depicts the computed tightly enclosing bounding boxes for the objects shown in FIG. 7A.
Figure 7A:
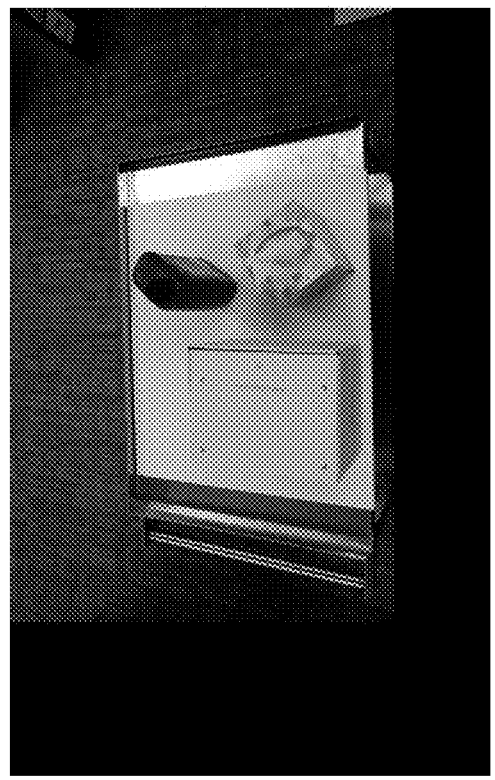
FIG. 7A depicts a scene containing three objects that are not occluding each other.

In operation 530, the system singulates the detected objects. In the case where there is only a single object, the process of singulation is straightforward, as the object is already singulated. Similarly, in the case where there is no occlusion of the objects, the singulation of the objects is also straightforward, as different parts of the depth map may be treated as belonging to different ones of the objects. In the case where there is occlusion, a method for singulating the objects may be applied. See, for example, FIG. 7A, which depicts a scene containing three objects that are not occluding each other. FIG. 7B depicts the computed tightly enclosing bounding boxes for the objects shown in FIG. 7A.

Figure 8B:
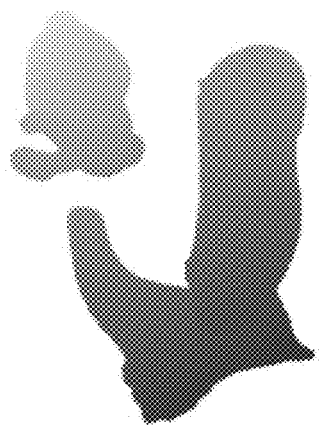
FIG. 8B is a rendering of a depth map where the objects have been separated from the background and the distance between the scanning device and the objects is encoded in the color of the pixels (e.g., light green for closes pixels, purple for pixels in a middle distance, and orange for more distant pixels).
Figure 8A:
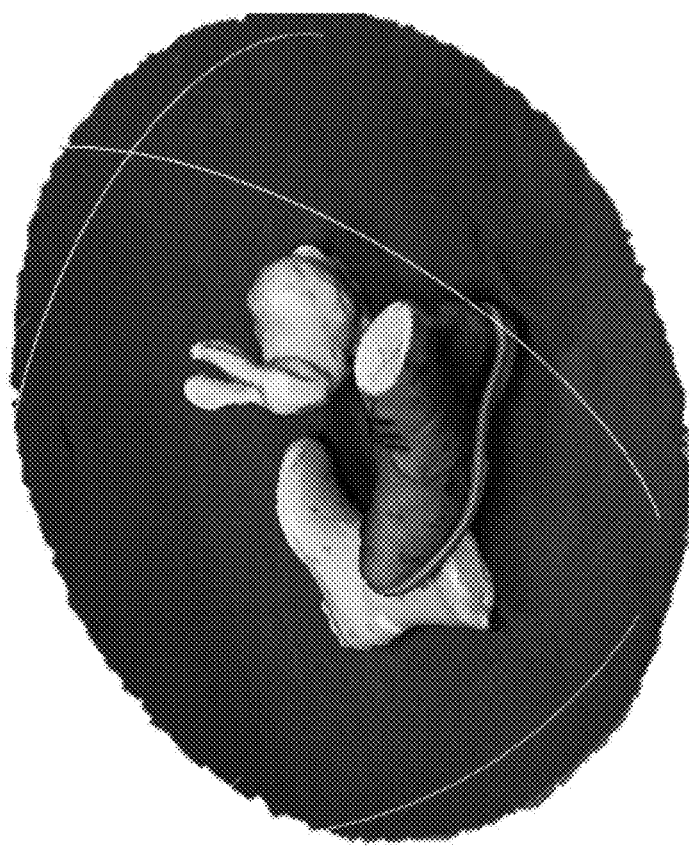
FIG. 8A is an example of an acquired 3D scene where multiple objects are generating or causing mutual occlusion.

FIG. 8A is an example of an acquired 3D scene where multiple objects are generating or causing mutual occlusion. FIG. 8B is a rendering of a depth map where the objects have been separated from the background and the distance between the scanning device and the objects is encoded in the color of the pixels (e.g., light green for closes pixels, purple for pixels in a middle distance, and orange for more distant pixels).

As shown in FIG. 8A, the brown boot partly occludes the yellow boot. Accordingly, it is difficult to determine which portions of the depth map shown in FIG. 8B correspond to the brown boot versus the yellow boot.

Figure 8C:
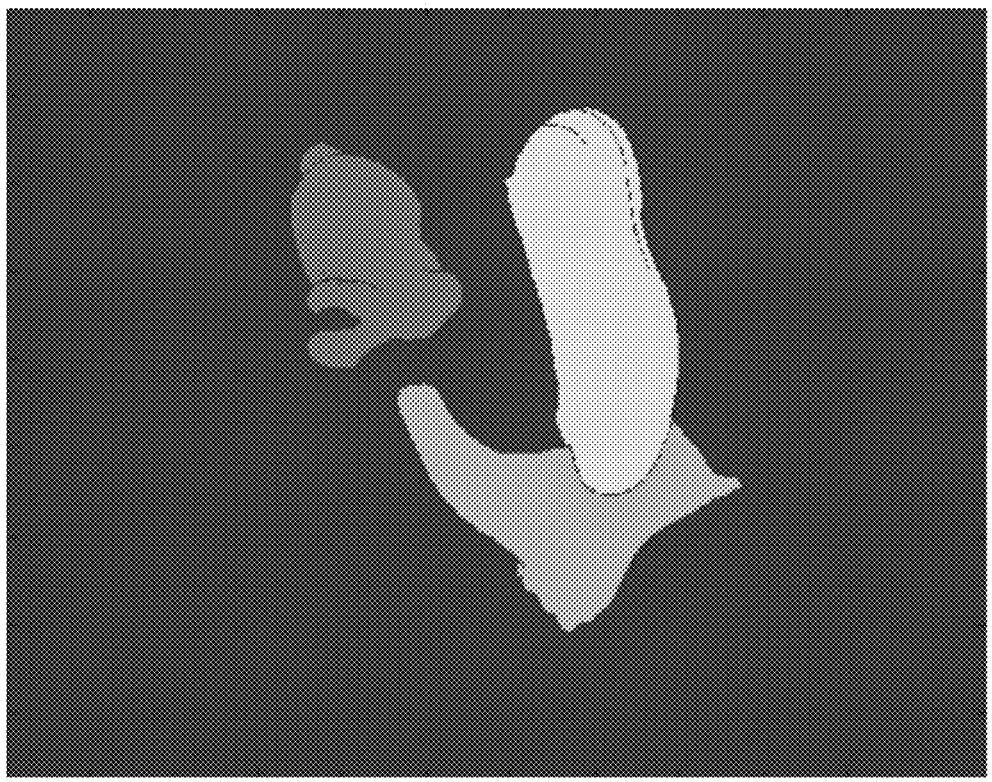
FIG. 8C is a depiction of an output of a fully convolutional network (FCN) trained to perform semantic segmentation of an input image.

If the objects are generating self-occlusions, as shown in FIG. 8A and FIG. 8B, then, in some embodiments, scene segmentation techniques are applied to singulate the objects. In some embodiments of the present invention, classical appearance-based segmentation based on visual grouping (e.g., clustering) is applied to perform the segmentation (see, e.g., Duda, R. O., Hart, P. E., & Stork, D. G. (2012). *Pattern classification*. John Wiley & Sons.) In some embodiments, semantic segmentation, for instance using Fully Convolutional Networks (FCNs) is used to perform segmentation (see, e.g., Long, J., Shelhamer, E., & Darrell, T. (2015). Fully convolutional networks for semantic segmentation. In *Proceedings of the IEEE conference on computer vision and pattern recognition* (pp. 3431-3440).). In some embodiments of the present invention, object detection with windows-based approaches may be applied (see, e.g., Redmon, J., Divvala, S., Girshick, R., & Farhadi, A. (2016). You only look once: Unified, real-time object detection. In *Proceedings of the IEEE conference on computer vision and pattern recognition* (pp. 779-788) and Liu, W., Anguelov, D., Erhan, D., Szegedy, C., Reed, S., Fu, C. Y., & Berg, A. C. (2016, October). SSD: Single shot multibox detector. In *European conference on computer vision* (pp. 21-37). Springer, Cham.). In still other embodiments, classical computer vision techniques such as key-point or contour detection and description are applied to perform singulation of the objects in the scene (see, e.g.: Lowe, D. G. (1999). Object recognition from local scale-invariant features. In Computer vision, 1999. *The proceedings of the seventh IEEE international conference on* (Vol. 2, pp. 1150-1157). IEEE; Morar, A., Moldoveanu, F., & Gröller, E. (2012, August). Image segmentation based on active contours without edges. In 2012 *IEEE 8th International Conference on Intelligent Computer Communication and Processing* (pp. 213-220). IEEE; and Johnson, A. E., & Hebert, M. (1999). Using spin images for efficient object recognition in cluttered 3D scenes. *IEEE Transactions on Pattern Analysis & Machine Intelligence*, (5), 433-449.) FIG. 8C is a depiction of a semantic segmentation map that is output by a fully convolutional network (FCN) trained to perform semantic segmentation of an input image, where the semantic segmentation map includes one or more segments, each segment identifying a portion of the depth map corresponding to a different one of the objects. Accordingly, a semantic segmentation map is used to singulate the portions of the depth map corresponding to different objects.

Therefore, the result of singulation operation 530 is one or more partial 3D models of object that have been singulated (e.g., separated from each other and separated from background and clutter in the depth map of the scene). The models are partial due to self-occlusion (e.g., no images of the back side of an object) and due to mutual occlusion (e.g., one object in the scene blocking a view of parts of another object in the scene).

In operation 550, the analysis module extrapolates complete 3D models for each partial 3D model. As used herein, the terms "complete 3D model" and "complete 3D models" include fully complete 3D model(s) as well as 3D model(s) that are not fully complete 3D model(s), but are more complete than the partial 3D model on which it is based (referred to herein as a "more complete 3D model" or "more complete 3D models"). The "more complete 3D model" or the "more complete 3D models" may include one or more gaps, tears, and/or holes not present in the corresponding fully complete 3D model. Because of the singulation operation performed in operation 530, each partial 3D model corresponds to a different object.

Figure 9:
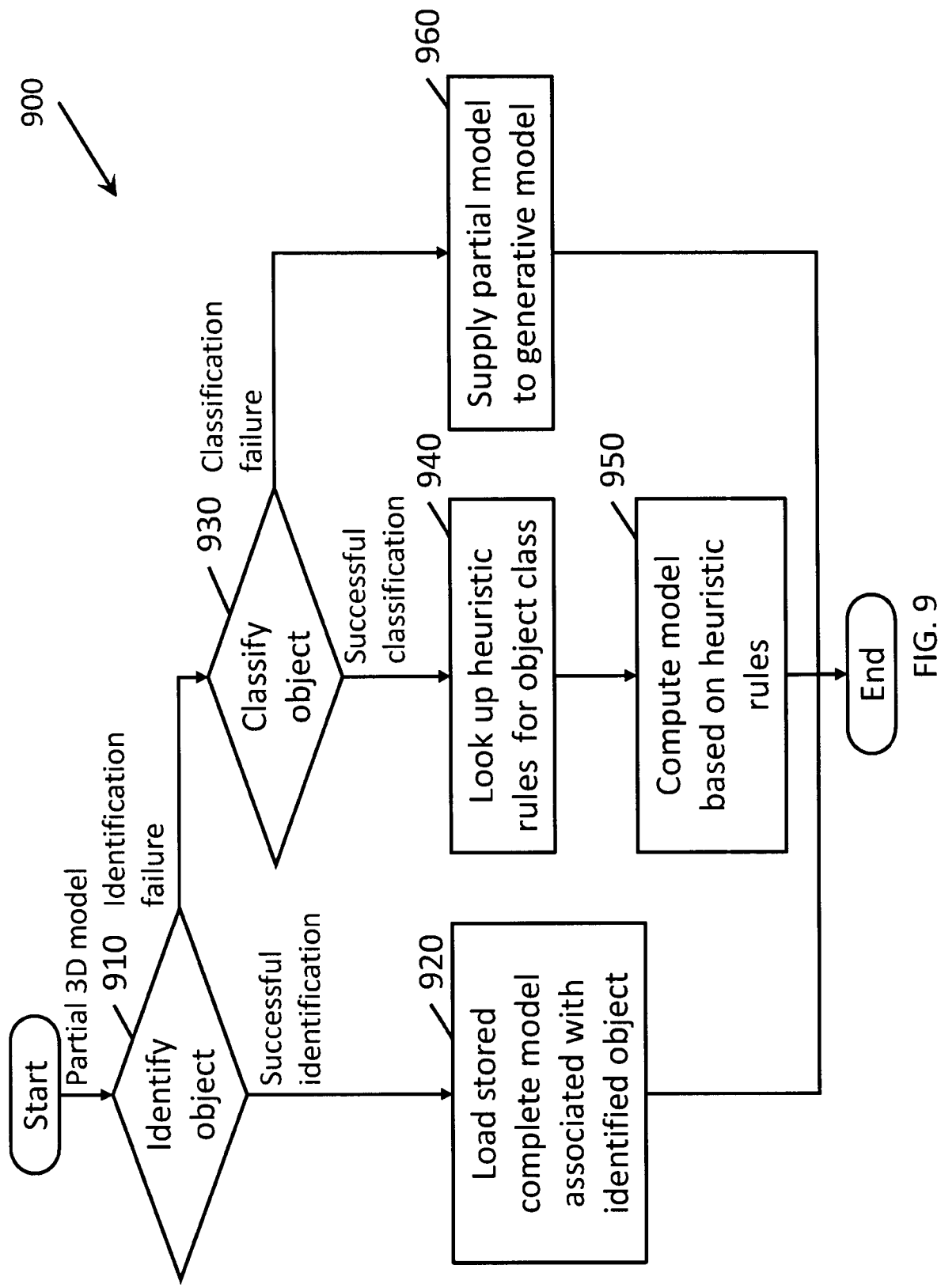
FIG. 9 is a flowchart depicting a method according to one embodiment of the present invention for extrapolating a complete 3D model from partial 3D model of an object.

FIG. 9 is a flowchart depicting a method 900 according to one embodiment of the present invention for extrapolating a complete 3D model from partial 3D model of an object. In some embodiments, the method 900 shown in FIG. 9 is performed as a part of operation 550 shown in FIG. 5.

Object Classification and Identification

Some aspects of embodiments of the present invention relate to systems and methods for using higher level data, in particular, a classification and/or identification of an object to apply heuristics or to retrieve other stored information regarding the target object. For example, manufactured products are, generally, substantially physically identical across all instances of those products. For example, continuing the above example of the bottle of detergent, all such bottles of detergent corresponding to a particular stock keeping unit (SKU) are substantially identical in size. Accordingly, if the target object can be identified as an instance of a particular known SKU, then the dimensions of the target object can be extrapolated as being the same as other instances of the SKU. As another example, aluminum beverage cans appear in very few standard sizes, of which the 12 oz variety is the most prevalent. Accordingly, if a target object is identified, based on partial information, as being a beverage can, then the object may be extrapolated as having a particular shape and dimensions consistent with the known size of an intact beverage can.

Referring to FIG. 9, in operation 910, the analysis module attempts to identify the target object based on the partial 3D model. As noted above, the partial 3D model captured by the scanning system 100 includes color and geometry information about scanned target object 10. Accordingly, in some embodiments of the present invention, the analysis module includes a database of entries in which each entry corresponds to particular known object (e.g., an object registered in a database), where each entry may include visual information of that entry encoded as a combination of color images and/or 3D models, along with metadata about the object.

The problem of querying a database of visual information, such as a database of images, is very well known. This problem classically assumes two different forms: image classification (i.e., the problem of assigning one or more classes to an image); and image retrieval (i.e., the problem of identifying the most similar image entry in the database with respect to the query image). One common image database is ImageNet (see, e.g., Deng, J., Dong, W., Socher, R., Li, L. J., Li, K., & Fei-Fei, L. (2009, June). Imagenet: A large-scale hierarchical image database. In *Computer Vision and Pattern Recognition*, 2009. *CVPR* 2009. *IEEE Conference on* (pp. 248-255). IEEE.), which includes millions of images and thousands of different classes. Some methodologies for performing these image classification and image identification tasks encompass Convolutional Neural Network (CNN) techniques (see, e.g., Daras, P., & Axenopoulos, A. (2010). A 3-D shape retrieval framework supporting multimodal queries. International Journal of Computer Vision, 89(2-3), 229-247., Vranic, D. V., Saupe, D., & Richter, J. (2001). Tools for 3-D-object retrieval: Karhunen-Loeve transform and spherical harmonics. In Multimedia Signal Processing, 2001 IEEE Fourth Workshop on (pp. 293-298). IEEE., and Gao, Y., & Dai, Q. (2014). View-based 3-D object retrieval: challenges and approaches. IEEE MultiMedia, 3(21), 52-57.).

As used herein, a convolutional neural network (CNN) can be regarded as a system that, given an input image, performs a set of operations such as 2D-convolutions, non-linear mapping, max-pooling aggregations and connections, to compute a vector of values (commonly called feature vector or feature map), which is then used by a classifier (e.g., a SoftMax classifier) in order to obtain an estimate of one or more class metadata for the input image.

Convolutional neural networks (CNNs) are able to provide very accurate class labels estimates (over >90% estimation correctness) and have become the standard technique for solving this type of problem. Each component (or "layer") of a CNN system is characterized by an associated set of parameters (or "weights") that need to be estimated in a so-called training stage. In particular, in the training stage, the CNN is provided with a large set of training images with associated class labels and the parameters or weights of each layer are tuned in order to maximize the accuracy of the class prediction for this set of training images. This is a very costly operation (generally involving several hours of computation on extremely powerful graphical processing units or GPUs) because the set of images used for training is usually in the order of 1 million or more and the number of parameters in the CNN is in the order 100,000 or more.

For image retrieval purposes, the feature vector or feature map may be treated as a "descriptor" for looking up a particular item in a database. In particular, the estimated feature vector for a query image is a vector of values (generally encoded as floating-point or fixed-point numeric values) of large dimensionality (e.g., 4,096 values). This feature vector can be considered as the "signature" or "descriptor" of the input image, and it has the property that feature vectors of objects in the same class are points close in the feature vector space (or "feature space"). Therefore, these feature vectors can be used for retrieval purposes: entries in the database are similar to the query image if their feature vectors are close to the descriptor of the query image in the feature vector space, with respect to a standard metric such as a L1 or L2 metric.

Given the large dimensionality of feature vector space, some optional techniques can be applied in order to perform some dimensionality reduction, based, for instance, on Principal Component Analysis (PCA) or Linear Discriminant Analysis (LDA).

In some embodiments of the present invention, a partial 3D model is used as the input query, rather than a 2D image. Techniques for using a CNN with a 3D model as input are much less developed than those for using a CNN on 2D images. One problem is encoding the information of a 3D model in a manner that is compatible with CNN architectures.

Figure 10A:
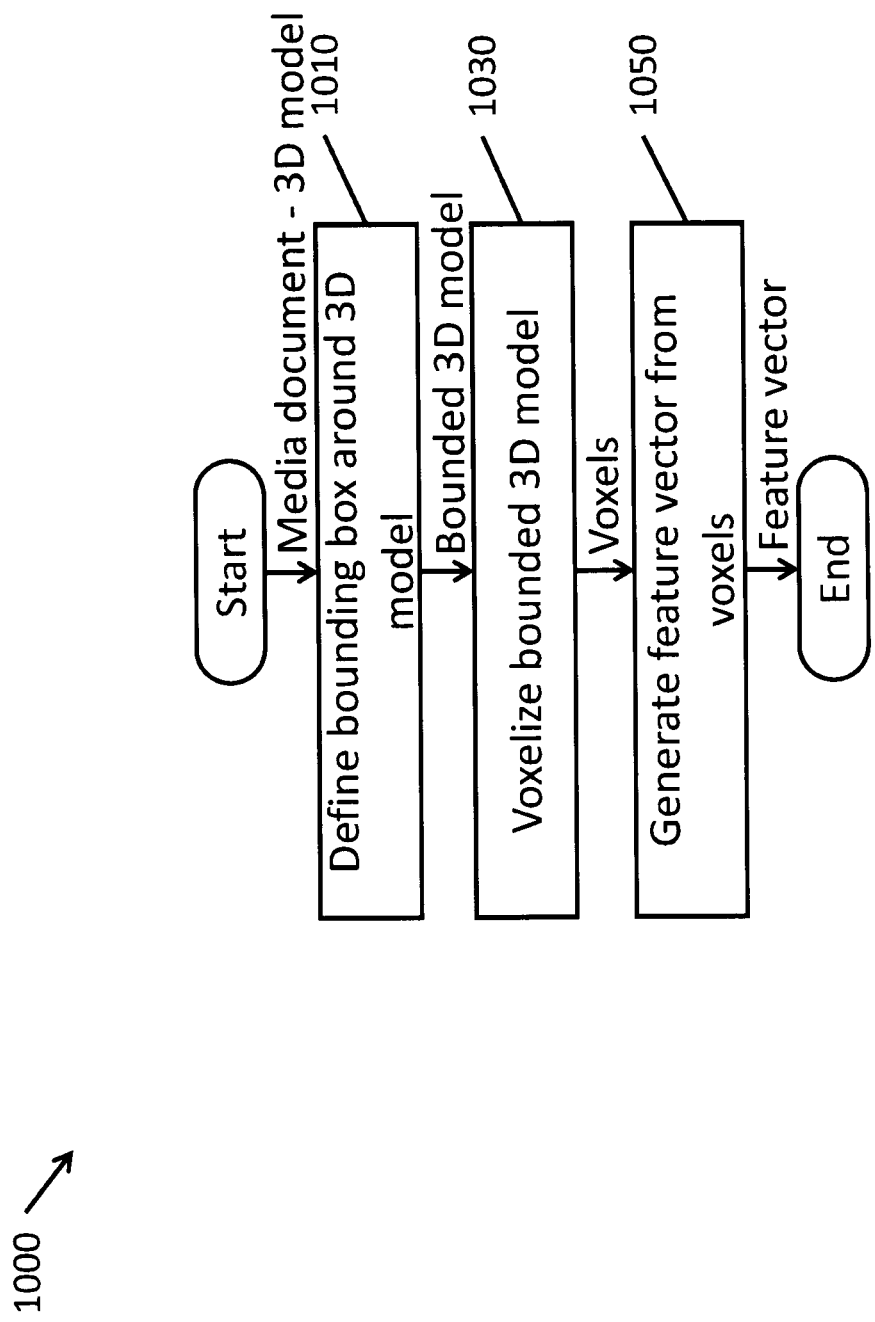
FIG. 10A is a flowchart illustrating a method for computing a feature vector in the case where the media document is a 3D model by voxelizing the 3D model according to one embodiment of the present invention, and FIG. 10B visually depicts the application of a CNN to a 3D model using voxelization.
Figure 10B:
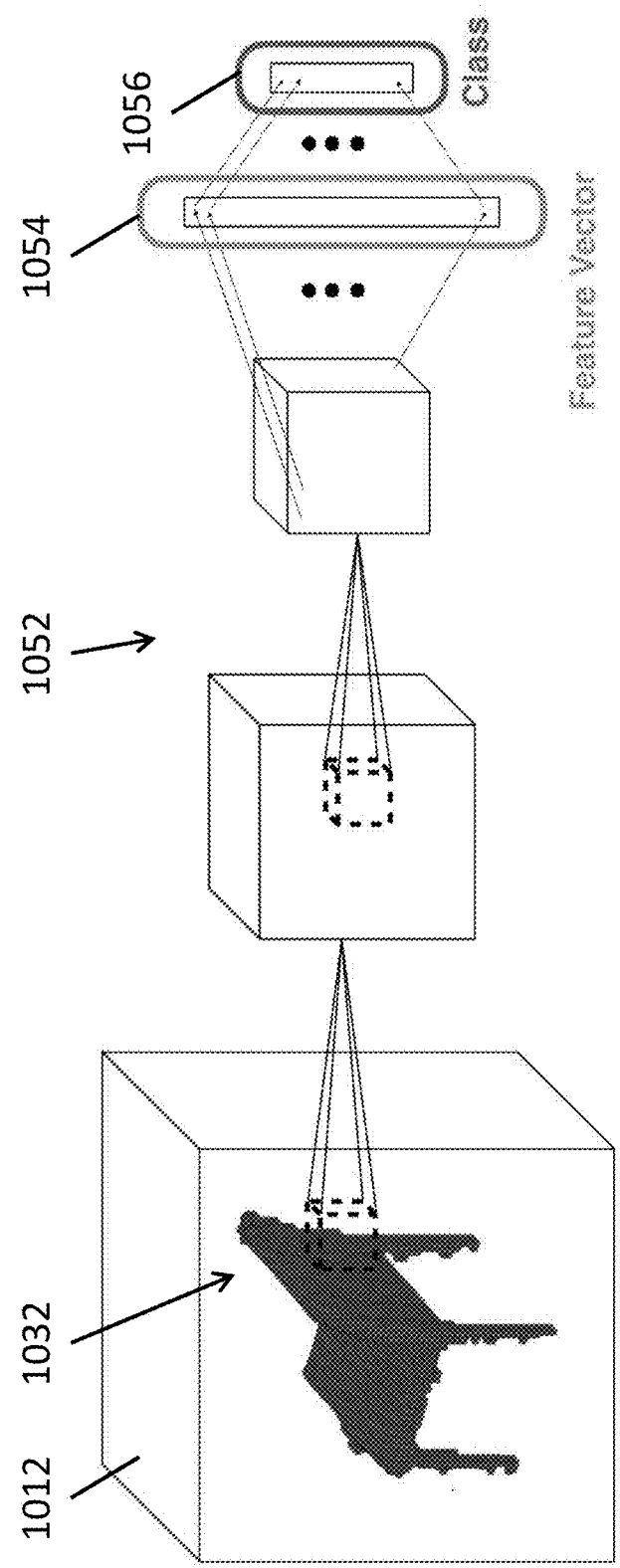

One approach to applying a CNN to 3D models is voxelization of the input 3D model. FIG. 10A is a flowchart illustrating a method 1000 for computing a feature vector in the case where the media document is a 3D model by voxelizing the 3D model according to one embodiment of the present invention, and FIG. 10B visually depicts the application of a CNN to a 3D model using voxelization. Referring to FIGS. 10A and 10B, in operation 1010, the processor defines a bounding box 1012 around the 3D model, such as by applying the rotating calipers algorithm to the 3D model. Systems and methods for applying a CNN to a 3D model are described in more detail in U.S. Pat. No. 10,296,603, "SYSTEMS AND METHODS FOR AUTOMATICALLY GENERATING METADATA FOR MEDIA DOCUMENTS," issued on Aug. 11, 2017, the entire disclosure of which is incorporated by reference herein.

In operation 1030, the processor voxelizes the model to generate a set of voxels representing the 3D model. In one embodiment, in the voxelization process, the processor divides the bounding box into subunits, referred to as voxels. For example, the bounding box may be a cube with 256 voxels on a side for a total of $256^3=16,777,216$ voxels, although embodiments of the present invention are not limited thereto, and may be substantially larger. Each voxel may be associated with a value representing whether or not some portion of the 3D model is contained within the voxel (e.g., in a binary valued voxelization), or in another case, each voxel may be associated with a value (e.g., an 8-bit value) representing the fraction or percentage of the voxel that is occupied by the 3D model (e.g., an integer valued or floating point voxelization). FIG. 10B depicts a voxelized 3D model 1032.

According to one embodiment of the present invention, operation 1030 further includes estimating features or performing principal component analysis to identify a "preferred view" before performing the voxelization. Identifying a consistent preferred view of the model before voxelization increases the likelihood that two different 3D models of substantially similar objects (or the same objects) will be voxelized from the same perspective (e.g., with the voxels defined along substantially the same coordinate space), thereby providing rotational invariance (e.g., the ability of the system to recognize models of objects that have been rotated).

In operation 1050, the processor generates a feature vector from the voxels generated in operation 1030. According to one embodiment of the present invention, the feature vector is 1054 is computed by supplying the voxels to a trained convolutional neural network 1052. Because the voxel representation can be regarded as a 3D tensor, the voxels can be directly supplied as input to a CNN, where the CNN is trained based on voxelized 3D models. The dashed cubes shown in FIG. 10B represent convolution operations. As shown in FIG. 10B, the feature vector 1054 can also be supplied to a classifier to generate classifications 1056 of the voxelized 3D model 1012. In embodiments where the CNN is used to obtain a descriptor, the feature vector 1054 is used as the descriptor of the input partial 3D model.

Another family of techniques for encoding the geometrical and textural information about the three-dimensional model encompasses its rendering from multiple directions.

Figure 11:
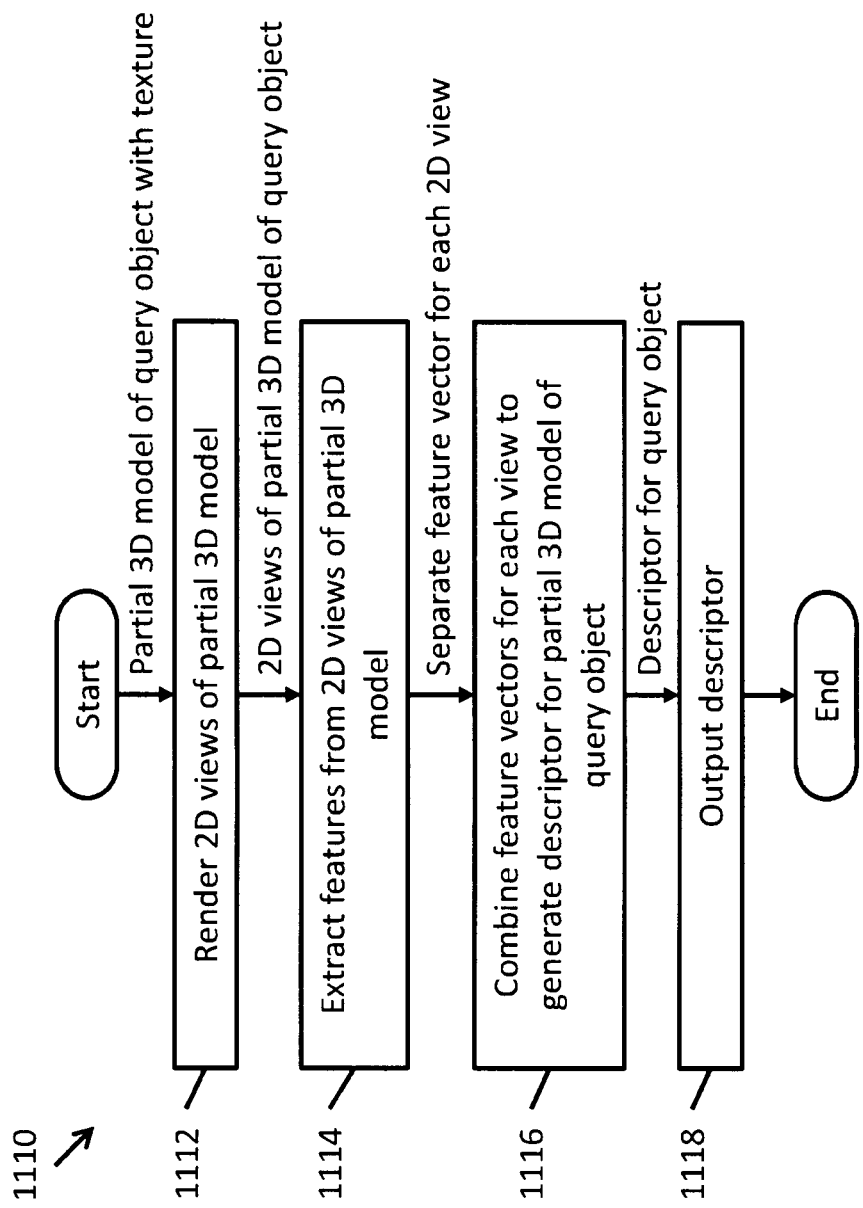
FIG. 11 is a flowchart of a method for computing a descriptor of a query object from a 3-D model of the query object according to one embodiment of the present invention.
Figure 12:
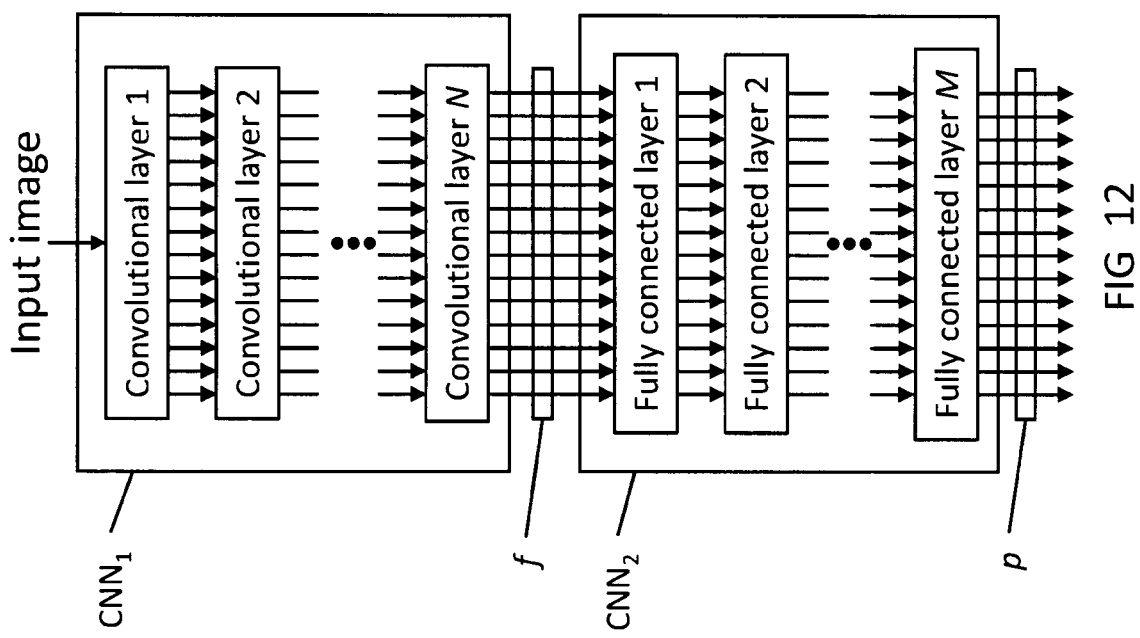
FIG. 12 is a block diagram of a convolutional neural network-based classification system according to one embodiment of the present invention.

FIG. 11 is a flowchart of a method for computing a descriptor of a query object from a 3-D model of the query object according to one embodiment of the present invention. FIG. 12 is a block diagram of a convolutional neural network-based classification system according to one embodiment of the present invention.

In some embodiments of the present invention, the object identification is performed by computing a descriptor of the 3-D model of the object, where the descriptor is a multi-dimensional vector having a fixed length (e.g., having a dimensionality of 16 or 4,096). Techniques for computing a descriptor of a 3-D model are based on a forward evaluation of a Multi-View Convolutional Neural Network (MV-CNN) or by a Volumetric Convolutional Neural Network (V-CNN). Such networks are usually trained for object classification, and, in some embodiments, the output of the penultimate layer of the network is used as the descriptor, as shown in FIG. 13 (described in more detail below).

Figure 13:
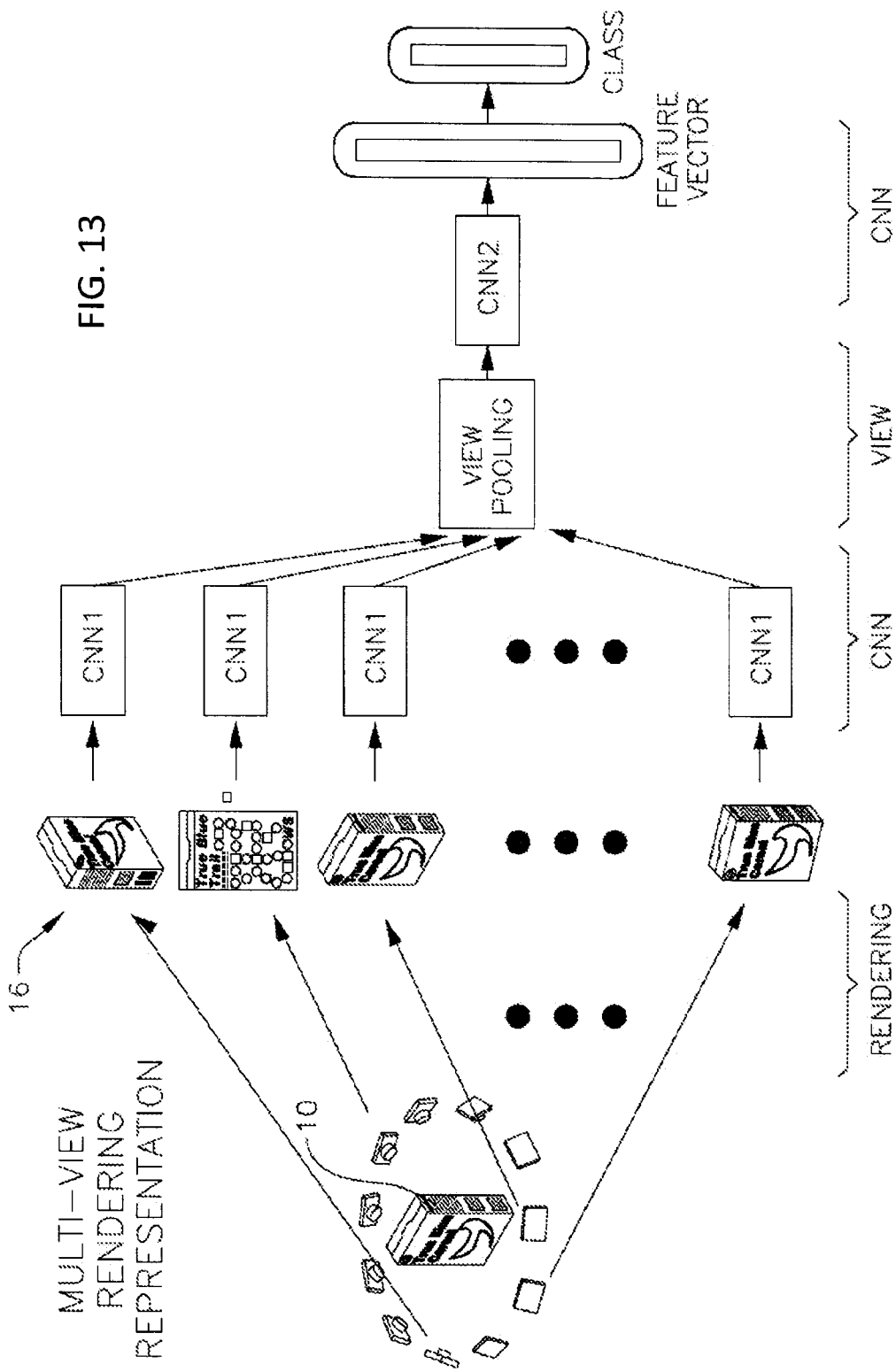
FIGS. 13 and 14 are illustrations of max-pooling according to one embodiment of the present invention.

In particular, in the embodiment shown in FIG. 13, the descriptor or feature vector is computed from 2-D views 16 of the 3-D model 10, as rendered by a view generation module in operation 1112. In operation 1114, the synthesized 2-D views are supplied to a descriptor generator to extract a descriptor or feature vector for each view. In operation 1116, the feature vectors for each view are combined (e.g., using max pooling, where a "pooled" feature vector is computed, where each position of the pooled feature vector is the maximum of the values at the corresponding position of the input feature vectors computed for each 2D view, as described in more detail below) to generate a descriptor for the 3-D model and to classify the object based on the descriptor. This feature vector may contain salient and characteristic aspects of the object's shape, and is used for subsequent classification or retrieval steps. The generated descriptor may be output in operation 1118.

Generally, the task of classifying a shape s into one of a set C of given classes (also called categories or labels) is distinguished from the task of retrieving from a database the shape that is most similar (under a specific metric) to a given shape. For the sake of convenience herein, shape retrieval will be considered as a special case of classification, in which each shape in the database represents a class in itself, and a shape s is classified with the label of the most similar shape in the database. This approach is sometimes referred to as nearest neighbor classification in the pattern recognition literature.

Several techniques for retrieval and classification from view-based representations of shapes are known in the literature. See, for example, Gao, Y., & Dai, Q. (2014). View-based 3-D object retrieval: challenges and approaches. IEEE MultiMedia, 3(21), 52-57. for a survey of such relevant techniques. For example, one approach (described in Furuya, T., & Ohbuchi, R. (2009, July). Dense sampling and fast encoding for 3-D model retrieval using bag-of-visual features. In Proceedings of the ACM international conference on image and video retrieval (p. 26). ACM.)[00144] expands on the concept of "bags of words," a classic method for object recognition in images, to the case of multi-view object recognition. As another example, convolutional neural networks (CNNs) may be used for multi-view object classification (see, e.g., Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953).).

According to some embodiments of the present invention, a convolutional neural network (CNN) is used to process the synthesized 2-D views to generate the classification of the object. FIG. 12 is a schematic diagram of a descriptor generator according to one embodiment of the present invention implemented as a deep convolutional neural network (CNN). The descriptor generator may be implemented as a component of the analysis module 600 through corresponding instructions stored in the memory of the analysis module 600. Generally, a deep CNN processes an image by passing the input image data (e.g., a synthesized 2-D view) through a cascade of layers. These layers can be grouped into multiple stages. The deep convolutional neural network shown in FIG. 12 includes two stages, a first stage $CNN_1$ made up of N layers (or sub-processes) and a second stage $CNN_2$ made up of M layers. In one embodiment, each of the N layers of the first stage $CNN_1$ includes a bank of linear convolution layers, followed by a point non-linearity layer and a non-linear data reduction layer. In contrast, each of the M layers of the second stage $CNN_2$ is a fully connected layer. The output p of the second stage is a class-assignment probability distribution. For example, if the entire CNN is trained to assign input images to one of k different classes, then the output of the second stage $CNN_2$ is a vector p that includes k different values, each value representing the probability (or "confidence") that the input image should be assigned the corresponding class.

As noted above, embodiments of the present invention may be implemented on suitable general-purpose computing platforms, such as general-purpose computer processors and application specific computer processors. (The analysis module may include such a suitable computing platform.) For example, graphical processing units (GPUs) and other vector processors (e.g., single instruction multiple data or SIMD instruction sets of general-purpose processors) are often well suited to performing the training and operation of neural networks.

In some embodiments, the neural network is trained based on training data, which may include a set of 3-D models of objects and their corresponding labels (e.g., the correct classifications of the objects). A portion of this training data may be reserved as cross-validation data to further adjust the parameters of during the training process, and a portion may also be reserved as a test data to confirm that the network is properly trained.

The parameters of the neural network (e.g., the weights of the connections between the layers) can be used using standard processes for training neural network such as backpropagation and gradient descent (see, e.g., LeCun, Y., & Bengio, Y. (1995). Convolutional networks for images, speech, and time series. The handbook of brain theory and neural networks, 3361(10), 1995.). In addition, the training process may be initialized using parameters from a pretrained general-purpose image classification neural network (see, e.g., Chatfield, K., Simonyan, K., Vedaldi, A., & Zisserman, A. (2014). Return of the devil in the details: Delving deep into convolutional nets. arXiv preprint arXiv: 1405.3531.).

As shown in FIG. 12, the values computed by the first stage $CNN_1$ (the convolutional stage) and supplied to the second stage $CNN_2$ (the fully connected stage) are referred to herein as a descriptor (or feature vector) f. The feature vector or descriptor may be a vector of data having a fixed size (e.g., 4,096 entries) which condenses or summarizes the main characteristics of the input image. As such, the first stage $CNN_1$ may be referred to as a feature extraction stage or feature extractor.

The architecture of a classifier described above with respect to FIG. 12 can be applied to classifying multi-view shape representations of 3-D objects based on n different 2-D views of the object. For example, the first stage $CNN_1$ can be applied independently to each of the n 2-D views used to represent the 3-D shape, thereby computing a set of n feature vectors (one for each of the 2-D views). Aspects of this technique are described in more detail in, for example, Su, H., Maji, S., Kalogerakis, E., & Learned-Miller, E. (2015). Multi-view convolutional neural networks for 3-D shape recognition. In Proceedings of the IEEE International Conference on Computer Vision (pp. 945-953). In some embodiments, the n separate feature vectors are combined using, for example, max pooling (see, e.g., Boureau, Y. L., Ponce, J., & LeCun, Y. (2010). A theoretical analysis of feature pooling in visual recognition. In Proceedings of the 27th international conference on machine learning (ICML-10) (pp. 111-118).).

Figure 14:
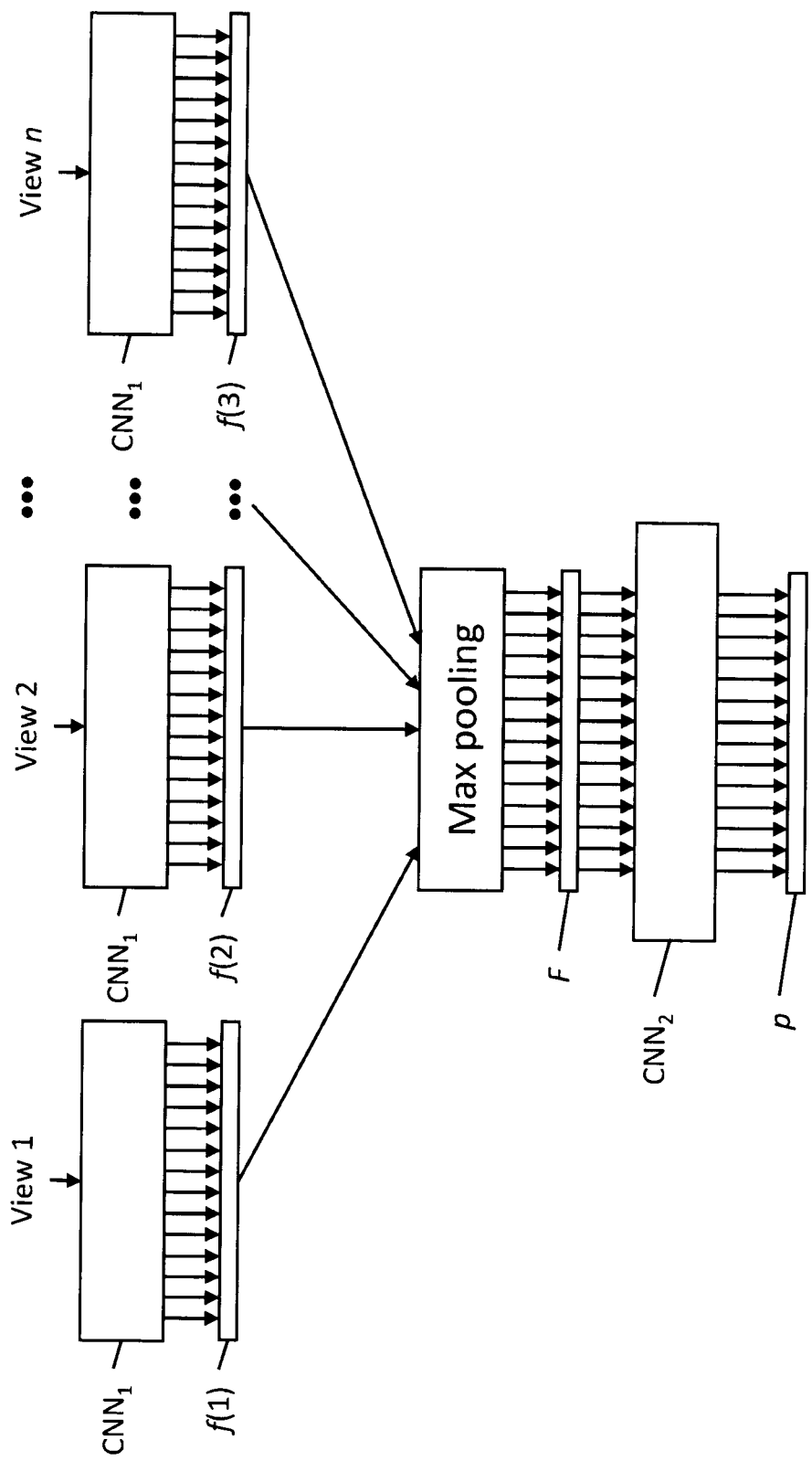

FIGS. 13 and 14 are illustration of max-pooling according to one embodiment of the present invention. As shown in FIG. 13, each of the n views is supplied to the first stage $CNN_1$ of the descriptor generator to generate n feature vectors. In max-pooling, the n feature vectors f are combined to generate a single combined feature vector or descriptor F, where the j-th entry of the descriptor F is equal to the maximum among the j-th entries among the n feature vectors f. The resulting descriptor F has the same length (or rank) as the n feature vectors f and therefore descriptor F can also be supplied as input to the second stage $CNN_2$ to compute a classification of the object.

In some embodiments of the present invention, the selection of particular poses of the virtual cameras, e.g., the selection of which particular 2-D views to render, results in a descriptor F having properties that are substantially rotationally invariant. For example, considering a configuration where all the virtual cameras are located on a sphere (e.g., all arranged at poses that are at the same distance from the center of the 3-D model or a particular point p on the ground plane, and all having optical axes that intersect at the center of the 3-D model or at the particular point p on the ground plane). Another example of an arrangement with similar properties includes all of the virtual cameras located at the same elevation above the ground plane of the 3-D model, oriented toward the 3-D model (e.g., having optical axes intersecting with the center of the 3-D model), and at the same distance from the 3-D model, in which case any rotation of the object around a vertical axis (e.g., perpendicular to the ground plane) extending through the center of the 3-D model will result in essentially the same vector or descriptor F (assuming that the cameras are placed at closely spaced locations).

Still additional embodiments of the present invention use point cloud representations of 3D models as inputs to CNNs. See, for example, Qi, C. R., Su, H., Mo, K., & Guibas, L. J. (2017). Pointnet: Deep learning on point sets for 3d classification and segmentation. *Proc. Computer Vision and Pattern Recognition (CVPR), IEEE,* 1(2), 4.

Accordingly, at operation 910 the analysis module attempts to identify an object from a partial 3D model by extracting a descriptor of the model (e.g., using the voxelization and/or multi-view techniques described above) and then searching a database (or "inventory") for an entry of the database that is within a threshold distance of the extracted descriptor. If such a matching entry is found, then the identification process is considered successful. According to some embodiments of the present invention, the entries of the database include associated complete 3D models of the object (e.g., models of the object as captured from all angles). As such, the stored complete 3D model of the object can then be loaded from the database at operation 920 and returned as the complete 3D model corresponding to the partial 3D model supplied as input. In some embodiments of the present invention, rather than load the 3D model, the dimensions of the minimum bounding box of the object associated with each entry may be stored as part of the metadata in the database, and therefore the dimensions may be loaded directly from the database. In some embodiments of the present invention, the analysis module further aligns the loaded complete model with the visual information acquired for the query to obtain an estimate of the full geometry of the query with respect to the visual acquisition system.

The identification approach of operations 910 and 920 will typically be most successful in circumstances, such as manufacturing lines, where the objects that are scanned are well defined (e.g., all of the objects that may be encountered are in the inventory). Therefore, in some embodiments of the present invention, it is sufficient to identify an object and load the corresponding information from the inventory.

However, an entirely identification-based approach may not be effective in circumstances that are not well defined, for example, where many of the objects that are scanned are not in the inventory and there is a great diversity of objects, such as in the field of logistics (e.g., package delivery, shipping, and supply chain management), because there are no complete models or dimensions to match in the inventory or because the matching closest items in the inventory give incorrect results (e.g., the wrong dimensions).

If the identification process at operation 910 fails (e.g., no entry has a descriptor that is within a threshold distance of the descriptor extracted from the input partial 3D model), then the analysis module attempts classification of the partial 3D model at operation 930. As noted above, classification may be performed by supplying the descriptor to a classifier layer to compute class labels. The input partial 3D model may then be assumed to correspond to an instance of the highest confidence class among the class labels. If the classification succeeds in operation 930, then heuristic rules are retrieved corresponding to the matching class in operation 940. The heuristic rules are then used in operation 950 to compute the complete 3D model.

Particular heuristic rules are specific to the various different classes of objects. For example, if the partial 3D model is classified as a bottle, as discussed above, then the system may assume that the complete 3D model has one or more axes of symmetry, aligns the partial 3D model in accordance with one of the axes of symmetry and then replicates the partial 3D model based on the selected axis of symmetry (e.g., applying appropriate rigid transformations such as rotations, translations, and reflections) to generate an extrapolated complete 3D model. As another example, the heuristics may include a canonical general shape for objects of the class, then scale the canonical shape in accordance with the dimensions of the partial 3D model. For example, while reusable coffee filters may differ in appearance, most reusable coffee filters have the same general shape, and therefore scaling the canonical shape the size of the partial 3D model will extrapolate an approximately accurately sized model for computing a minimum (or tightly) enclosing bounding box for the object.

In some embodiments of the present invention, the partial 3D model is supplied to a generative model that is configured to extrapolate a complete 3D model from the partial 3D model. One example of a generative model (see, e.g., Goodfellow, I., Bengio, Y., Courville, A., & Bengio, Y. (2016). *Deep learning* (Vol. 1). Cambridge: MIT press.) is a conditional generative adversarial network (or conditional GAN, see, e.g., Goodfellow, I., Pouget-Abadie, J., Mirza, M., Xu, B., Warde-Farley, D., Ozair, S., . . . & Bengio, Y. (2014). Generative adversarial nets. In *Advances in neural information processing systems* (pp. 2672-2680).), where the partial 3D model is input to the conditional GAN as the "condition." In more detail, a generative model can be trained to generate a full 3-D model of a known object based on being supplied a view of a portion of the object. Examples of techniques for implementing generative models are described, for example, in Wu, Z., Song, S., Khosla, A., Yu, F., Zhang, L., Tang, X., & Xiao, J. (2015). 3d shapenets: A deep representation for volumetric shapes. In *Proceedings of the IEEE Conference on Computer Vision and Pattern Recognition* (pp. 1912-1920). and Yang, B., Rosa, S., Markham, A., Trigoni, N., & Wen, H. (2018). Dense 3D Object Reconstruction from a Single Depth View. *IEEE Transactions on Pattern Analysis and Machine Intelligence*.

In some embodiments of the present invention, the partial 3D model is supplied to the generative model if the classification of the partial 3D model fails in operation 930. In some embodiments, the classification is omitted, and the partial model is supplied directly to the generative model to extrapolate a complete 3D model.

In some embodiments of the present invention, the computed minimum enclosing bounding box is stored as a new entry in the inventory for the extracted descriptor. In some embodiments, the analysis module adds an entry to the inventory only if a threshold confidence level in the computed minimum enclosing bounding box is satisfied.

Accordingly, methods in accordance with the techniques depicted in flowchart 900 of FIG. 9 provide mechanisms for extrapolating a complete 3D model from a partial 3D model.

Referring back to FIG. 5, at operation 570, a tightly enclosing bounding box is computed or retrieved for each of the extrapolated complete 3D models. As noted above, in some embodiments of the present invention, such as the case of identifying a matching object from an inventory, the separate operation of computing a tightly enclosing bounding box may be omitted because the dimensions of the tightly enclosing bounding box may already be known and stored in the inventory. At operation 590, these tightly enclosing bounding boxes can then be output (along with their dimensions) for display on a user interface (e.g., display device 122).

As such, aspects of embodiments of the present invention provide systems and methods for object dimensioning based on partial visual information of the objects to be dimensioned. In addition, aspects of embodiments of the present invention allow the dimensioning to be applied to multiple objects in a same frame, by applying techniques to singulate the objects and computing the dimensions of each object separately, even in the case where the views of parts of the objects are subject to self-occlusion or mutual occlusion.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for estimating tightly enclosing bounding boxes comprising:

controlling, by a computing system, a scanning system comprising one or more depth cameras to capture visual information of a scene comprising one or more objects;

detecting, by the computing system, the one or more objects of the scene based on the visual information;

singulating, by the computing system, each of the one or more objects from a frame of the scene to generate one or more 3D models corresponding to the one or more objects, the one or more 3D models comprising a partial 3D model of a corresponding one of the one or more objects;

extrapolating, by the computing system, a more complete 3D model of the corresponding one of the one or more objects based on the partial 3D model, wherein:

the extrapolating the more complete 3D model comprises searching an inventory of 3D models for a model matching the partial 3D model and to output the model matching the partial 3D model as the more complete 3D model, wherein each of the 3D models of the inventory is associated with a corresponding descriptor in feature space, and wherein the searching the inventory of 3D model comprises:

extracting a descriptor of the partial 3D model by supplying the partial 3D model to a feature extractor comprising a convolutional neural network, and identifying the model matching the partial 3D model in accordance with a highest similarity between the descriptor of the partial 3D model and the descriptors of the 3D models of the inventory; and estimating, by the computing system, a tightly enclosing bounding box of the corresponding one of the one or more objects based on the more complete 3D model.

2. The method of claim 1, wherein the scanning system further comprises one or more color cameras separate from the one or more depth cameras.

3. The method of claim 1, wherein the one or more depth cameras comprises:

a time-of-flight depth camera;

a structured light depth camera;

a stereo depth camera comprising at least two color cameras;

a stereo depth camera comprising:
at least two color cameras; and
a color projector;

a stereo depth camera comprising at least two infrared cameras; or a stereo depth camera comprising:
a color camera;
a plurality of infrared cameras; and an infrared projector configured to emit light in a wavelength interval that is detectable by the plurality of infrared cameras.

4. The method of claim 1, wherein the detecting the one or more objects in the scene comprises separating the one or more objects from depictions of background and ground plane in the visual information.

5. The method of claim 1, wherein the extrapolating the more complete 3D model comprises supplying the partial 3D model to a generative model trained to predict a generated 3D model based on an input partial 3D model, the more complete 3D model comprising the generated 3D model.

6. The method of claim 5, wherein the generative model comprises a conditional generative adversarial network.

7. The method of claim 1, wherein the extracting the descriptor of the partial 3D model comprises:
defining a bounding box around the 3D model;
voxelizing the partial 3D model to compute a plurality of voxels; and
supplying the voxels to the convolutional neural network.

8. The method of claim 1, wherein the extracting the descriptor of the partial 3D model comprises:
rendering a plurality of 2D views of the partial 3D model;
extracting feature vectors from the 2D views of the partial 3D model by supplying the plurality of 2D views to a first stage convolutional neural network; and
combining the feature vectors to generate the descriptor.

9. The method of claim 8, wherein the feature vectors are combined using max pooling.

10. The method of claim 1, wherein the extrapolating the complete 3D model comprises:
classifying the partial 3D model to compute a matching classification;
loading one or more heuristic rules for generating more complete 3D models for the matching classification; and
generating the more complete 3D model from the partial 3D model in accordance with the one or more heuristic rules.

11. The method of claim 10, wherein the one or more heuristic rules comprise one or more assumed axes of symmetry of the more complete 3D model based on the matching classification, or a canonical general shape of the more complete 3D model based on the matching classification.

12. The method of claim 1, wherein the one or more objects comprise a plurality of objects, and
wherein the singulating each the one or more objects from the frame of the scene comprises singulating the plurality of objects by applying an appearance-based segmentation to the visual information.

13. The method of claim 1, wherein the one or more objects comprise a plurality of objects, and
wherein the singulating each the one or more objects from the frame of the scene comprises singulating the plurality of objects by applying semantic segmentation to the visual information.

14. The method of claim 13, wherein the applying semantic segmentation comprises supplying the visual information to a trained fully convolutional neural network to compute a segmentation map, and
wherein each partial 3D model corresponds to one segment of the segmentation map.

15. The method of claim 1, further comprising associating the tightly enclosing bounding box with an item descriptor.

16. A system for estimating tightly enclosing bounding boxes comprising:
a scanning system comprising one or more depth cameras;
a processor configured to control the scanning system; and
memory storing instructions that, when executed by the processor, cause the processor to:
control the one or more depth cameras to capture visual information of a scene comprising one or more objects;
detect the one or more objects of the scene based on the visual information;
singulate each the one or more objects from a frame of the scene to generate one or more 3D models corresponding to the one or more objects, the one or more 3D models comprising a partial 3D model of a corresponding one of the one or more objects;
extrapolate a more complete 3D model of the corresponding one of the one or more objects based on the partial 3D model, wherein:
the extrapolating the more complete 3D model comprises searching an inventory of 3D models for a model matching the partial 3D model and to output the model matching the partial 3D model as the more complete 3D model, wherein each of the 3D models of the inventory is associated with a corresponding descriptor in feature space, and wherein the searching the inventory of 3D model comprises:
extracting a descriptor of the partial 3D model by supplying the partial 3D model to a feature extractor comprising a convolutional neural network, and
identifying the model matching the partial 3D model in accordance with a highest similarity between the descriptor of the partial 3D model and the descriptors of the 3D models of the inventory; and
estimate a tightly enclosing bounding box of the corresponding one of the one or more objects based on the more complete 3D model.

17. The system of claim 16, wherein the instructions to extrapolate the more complete 3D model comprise instructions that, when executed by the processor, cause the processor to supply the partial 3D model to a generative model trained to predict a generated 3D model based on an input partial 3D model, the more complete 3D model comprising the generated 3D model.

18. The system of claim 17, wherein the generative model comprises a conditional generative adversarial network.

19. The system of claim 16, wherein the instructions to extrapolate the more complete 3D model comprise instructions that, when executed by the processor, cause the processor to search an inventory of 3D models for a model matching the partial 3D model and to output the model matching the partial 3D model as the more complete 3D model.

* * * * *